US011287350B2

(12) United States Patent
Yeung et al.

(10) Patent No.: US 11,287,350 B2
(45) Date of Patent: *Mar. 29, 2022

(54) FUEL, COMMUNICATIONS, AND POWER CONNECTION METHODS

(71) Applicant: BJ Energy Solutions, LLC, Houston, TX (US)

(72) Inventors: Tony Yeung, Houston, TX (US); Ricardo Rodriguez-Ramon, Houston, TX (US); Patrick Thomson, Houston, TX (US)

(73) Assignee: BJ Energy Solutions, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,739

(22) Filed: Jul. 23, 2021

(65) Prior Publication Data
US 2021/0348476 A1   Nov. 11, 2021

Related U.S. Application Data

(63) Continuation of application No. 15/929,708, filed on May 18, 2020.
(Continued)

(51) Int. Cl.
*E21B 21/10* (2006.01)
*G01M 3/28* (2006.01)
(Continued)

(52) U.S. Cl.
CPC .......... *G01M 3/2815* (2013.01); *E21B 34/08* (2013.01); *E21B 43/267* (2013.01);
(Continued)

(58) Field of Classification Search
CPC ... G01M 3/2815; G01M 3/26; E21B 43/2607; E21B 43/267; E21B 34/08; E21B 47/12; F02C 7/222; F02C 9/28; F02C 9/56
(Continued)

(56) References Cited

U.S. PATENT DOCUMENTS 2,498,229 A   2/1950  Adler
2,535,703 A   12/1950 Smith et al.
(Continued)

FOREIGN PATENT DOCUMENTS

AU    9609498    7/1999
AU     737970    9/2001
(Continued)

OTHER PUBLICATIONS

AFGlobal Corporation, Durastim Hydraulic Fracturing Pump, A Revolutionary Design for Continuous Duty Hydraulic Fracturing, 2018.
(Continued)

*Primary Examiner* — Minh Q Le
(74) *Attorney, Agent, or Firm* — Womble Bond Dickinson (US) LLP

(57) ABSTRACT

Embodiments of systems and methods for supplying fuel, enabling communications, and conveying electric power associated with operation of a hydraulic fracturing unit of a plurality of hydraulic fracturing units are disclosed and may include a fuel line connection assembly configured to be connected to the first hydraulic fracturing unit and to supply fuel from a fuel source to a gas turbine engine connected to the hydraulic fracturing unit. A system also may include a communications cable assembly configured to be connected to the hydraulic fracturing unit and to enable data communications between the hydraulic fracturing unit and a data center or another hydraulic fracturing unit. A system further
(Continued)

may include a power cable assembly configured to be connected to the hydraulic fracturing unit and to convey electric power between the hydraulic fracturing unit and a remote electrical power source or the plurality of hydraulic fracturing units.

15 Claims, 18 Drawing Sheets

Related U.S. Application Data

(60) Provisional application No. 62/704,401, filed on May 8, 2020, provisional application No. 62/900,100, filed on Sep. 13, 2019, provisional application No. 62/900,112, filed on Sep. 13, 2019.

(51) Int. Cl.

| | | |
|---|---|---|
| *E21B 34/08* | (2006.01) | |
| *E21B 47/12* | (2012.01) | |
| *E21B 43/267* | (2006.01) | |
| *F02C 7/22* | (2006.01) | |
| *F02C 9/28* | (2006.01) | |
| *F02C 9/56* | (2006.01) | |
| *E21B 43/26* | (2006.01) | |
| *G01M 3/26* | (2006.01) | |

(52) U.S. Cl.
CPC .......... *E21B 43/2607* (2020.05); *E21B 47/12* (2013.01); *F02C 7/222* (2013.01); *F02C 9/28* (2013.01); *F02C 9/56* (2013.01); *G01M 3/26* (2013.01)

(58) Field of Classification Search
USPC .......................................... 137/883; 166/112
See application file for complete search history.

(56) References Cited

U.S. PATENT DOCUMENTS

| | | |
|---|---|---|
| 2,868,004 A | 1/1959 | Runde |
| 2,940,377 A | 6/1960 | Darnell et al. |
| 2,947,141 A | 8/1960 | Russ |
| 3,068,796 A | 12/1962 | Pfluger et al. |
| 3,191,517 A | 6/1965 | Solzman |
| 3,257,031 A | 6/1966 | Dietz |
| 3,378,074 A | 4/1968 | Kiel |
| 3,463,612 A | 8/1969 | Whitsel |
| 3,550,696 A | 12/1970 | Kenneday |
| 3,656,582 A | 4/1972 | Alcock |
| 3,739,872 A | 6/1973 | McNair |
| 3,759,063 A | 9/1973 | Bendall |
| 3,765,173 A | 10/1973 | Harris |
| 3,773,438 A | 11/1973 | Hall et al. |
| 3,786,835 A | 1/1974 | Finger |
| 3,791,682 A | 2/1974 | Mitchell |
| 3,796,045 A | 3/1974 | Foster |
| 3,820,922 A | 6/1974 | Buse et al. |
| 4,010,613 A | 3/1977 | McInerney |
| 4,031,407 A | 6/1977 | Reed |
| 4,059,045 A | 11/1977 | McClain |
| 4,086,976 A | 5/1978 | Holm et al. |
| 4,117,342 A | 9/1978 | Melley, Jr. |
| 4,204,808 A | 5/1980 | Reese et al. |
| 4,209,079 A | 6/1980 | Marchal et al. |
| 4,222,229 A | 9/1980 | Uram |
| 4,269,569 A | 5/1981 | Hoover |
| 4,311,395 A | 1/1982 | Douthitt et al. |
| 4,330,237 A | 5/1982 | Battah |
| 4,341,508 A | 7/1982 | Rambin, Jr. |
| 4,357,027 A | 11/1982 | Zeitlow |
| 4,383,478 A | 5/1983 | Jones |
| 4,402,504 A | 9/1983 | Christian |
| 4,457,325 A | 7/1984 | Green |
| 4,470,771 A | 9/1984 | Hall et al. |
| 4,483,684 A | 11/1984 | Black |
| 4,505,650 A | 3/1985 | Hannett et al. |
| 4,574,880 A | 3/1986 | Handke |
| 4,584,654 A | 4/1986 | Crane |
| 4,672,813 A | 6/1987 | David |
| 4,754,607 A | 7/1988 | Mackay |
| 4,782,244 A | 11/1988 | Wakimoto |
| 4,796,777 A | 1/1989 | Keller |
| 4,869,209 A | 9/1989 | Young |
| 4,913,625 A | 4/1990 | Gerlowski |
| 4,983,259 A | 1/1991 | Duncan |
| 4,990,058 A | 2/1991 | Eslinger |
| 5,135,361 A | 8/1992 | Dion |
| 5,245,970 A | 9/1993 | Iwaszkiewicz et al. |
| 5,291,842 A | 3/1994 | Sallstrom et al. |
| 5,362,219 A | 11/1994 | Paul et al. |
| 5,537,813 A | 7/1996 | Davis et al. |
| 5,553,514 A | 9/1996 | Walkowc |
| 5,560,195 A | 10/1996 | Anderson et al. |
| 5,586,444 A | 12/1996 | Fung |
| 5,622,245 A | 4/1997 | Reik |
| 5,626,103 A | 5/1997 | Haws et al. |
| 5,651,400 A | 7/1997 | Corts et al. |
| 5,678,460 A | 10/1997 | Walkowc |
| 5,717,172 A | 2/1998 | Griffin, Jr. et al. |
| 5,720,598 A | 2/1998 | de Chizzelle |
| 5,839,888 A | 11/1998 | Harrison |
| 5,846,062 A | 12/1998 | Yanagisawa et al. |
| 5,983,962 A | 11/1999 | Gerardot |
| 6,041,856 A | 3/2000 | Thrasher et al. |
| 6,050,080 A | 4/2000 | Horner |
| 6,067,962 A | 5/2000 | Bartley et al. |
| 6,071,188 A | 6/2000 | O'Neill et al. |
| 6,074,170 A | 6/2000 | Bert et al. |
| 6,123,751 A | 9/2000 | Nelson et al. |
| 6,129,335 A | 10/2000 | Yokogi |
| 6,145,318 A | 11/2000 | Kaplan et al. |
| 6,230,481 B1 | 5/2001 | Jahr |
| 6,279,309 B1 | 8/2001 | Lawlor, II et al. |
| 6,321,860 B1 | 11/2001 | Reddoch |
| 6,334,746 B1 | 1/2002 | Nguyen et al. |
| 6,530,224 B1 | 3/2003 | Conchieri |
| 6,543,395 B2 | 4/2003 | Green |
| 6,655,922 B1 | 12/2003 | Flek |
| 6,765,304 B2 | 7/2004 | Baten et al. |
| 6,786,051 B2 | 9/2004 | Kristich et al. |
| 6,851,514 B2 | 2/2005 | Han et al. |
| 6,859,740 B2 | 2/2005 | Stephenson et al. |
| 6,901,735 B2 | 6/2005 | Lohn |
| 7,007,966 B2 | 3/2006 | Campion |
| 7,065,953 B1 | 6/2006 | Kopko |
| 7,143,016 B1 | 11/2006 | Discenzo et al. |
| 7,222,015 B2 | 5/2007 | Davis et al. |
| 7,388,303 B2 | 6/2008 | Seiver |
| 7,545,130 B2 | 6/2009 | Latham |
| 7,552,903 B2 | 6/2009 | Dunn et al. |
| 7,563,076 B2 | 7/2009 | Brunet et al. |
| 7,563,413 B2 | 7/2009 | Naets et al. |
| 7,594,424 B2 * | 9/2009 | Fazekas ............. G01M 3/2815 73/37 |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,779,961 B2 | 8/2010 | Matte |
| 7,789,452 B2 | 9/2010 | Dempsey et al. |
| 7,845,413 B2 | 12/2010 | Shampine et al. |
| 7,886,702 B2 | 2/2011 | Jerrell et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,980,357 B2 | 7/2011 | Edwards |
| 8,083,504 B2 | 12/2011 | Williams et al. |
| 8,186,334 B2 | 5/2012 | Ooyama |
| 8,196,555 B2 | 6/2012 | Ikeda et al. |
| 8,202,354 B2 | 6/2012 | Iijima |
| 8,316,936 B2 | 11/2012 | Roddy et al. |

(56) References Cited

U.S. PATENT DOCUMENTS

| | | |
|---|---|---|
| 8,414,673 B2 | 4/2013 | Raje et al. |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,672,606 B2 | 3/2014 | Glynn et al. |
| 8,707,853 B1 | 4/2014 | Dille et al. |
| 8,714,253 B2 | 5/2014 | Sherwood et al. |
| 8,757,918 B2 | 6/2014 | Ramnarain et al. |
| 8,770,329 B2 | 7/2014 | Spitler |
| 8,784,081 B1 | 7/2014 | Blume |
| 8,789,601 B2 | 7/2014 | Broussard et al. |
| 8,794,307 B2 | 8/2014 | Coquilleau et al. |
| 8,801,394 B2 | 8/2014 | Anderson |
| 8,851,441 B2 | 10/2014 | Acuna et al. |
| 8,905,056 B2 | 12/2014 | Kendrick |
| 8,951,019 B2 | 2/2015 | Hains et al. |
| 8,973,560 B2 | 3/2015 | Krug |
| 8,997,904 B2 | 4/2015 | Cryer et al. |
| 9,032,620 B2 | 5/2015 | Frassinelli et al. |
| 9,057,247 B2 | 6/2015 | Kumar et al. |
| 9,103,193 B2 | 8/2015 | Coli et al. |
| 9,121,257 B2 | 9/2015 | Coli et al. |
| 9,140,110 B2 | 9/2015 | Coli et al. |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,656,762 B2 | 5/2017 | Kamath et al. |
| 9,689,316 B1 | 6/2017 | Crom |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Cram |
| 9,840,897 B2 | 12/2017 | Larson |
| 9,840,901 B2 | 12/2017 | Oering et al. |
| 9,850,422 B2 | 12/2017 | Lestz et al. |
| 9,856,131 B1 | 1/2018 | Moffitt |
| 9,863,279 B2 | 1/2018 | Laing et al. |
| 9,869,305 B1 | 1/2018 | Crowe et al. |
| 9,879,609 B1 | 1/2018 | Crowe et al. |
| 9,893,500 B2 | 2/2018 | Oehring et al. |
| 9,893,660 B2 | 2/2018 | Peterson et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Gehring |
| 10,040,541 B2 | 8/2018 | Wilson et al. |
| 10,060,293 B2 | 8/2018 | Del Bono |
| 10,060,349 B2 | 8/2018 | Álvarez et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 * | 5/2019 | De La Cruz ........ G01M 3/2815 |
| 10,303,190 B2 | 5/2019 | Shock |
| 10,316,832 B2 | 6/2019 | Byrne |
| 10,317,875 B2 | 6/2019 | Pandurangan et al. |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,584,645 B2 | 3/2020 | Nakagawa et al. |
| 10,598,258 B2 | 3/2020 | Oehring et al. |
| 10,610,842 B2 | 4/2020 | Chong |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,859,203 B1 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,895,202 B1 | 1/2021 | Yeung et al. |
| 10,907,459 B1 | 2/2021 | Yeung et al. |

(56) References Cited

U.S. PATENT DOCUMENTS

| | | |
|---|---|---|
| 10,927,774 B2 | 2/2021 | Cai et al. |
| 10,954,770 B1 | 3/2021 | Yeung et al. |
| 10,954,855 B1 | 3/2021 | Ji et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,961,993 B1 | 3/2021 | Ji et al. |
| 10,982,523 B1 | 4/2021 | Hill et al. |
| 10,989,019 B2 | 4/2021 | Cai et al. |
| 10,995,564 B2 | 5/2021 | Miller et al. |
| 11,002,189 B2 | 5/2021 | Yeung et al. |
| 11,015,423 B1 | 5/2021 | Yeung et al. |
| 11,035,214 B2 | 6/2021 | Cui et al. |
| 11,047,379 B1 | 6/2021 | Li et al. |
| 11,053,853 B2 | 7/2021 | Li et al. |
| 11,060,455 B1 | 7/2021 | Yeung et al. |
| 11,085,281 B1 | 8/2021 | Yeung et al. |
| 11,105,250 B1 | 8/2021 | Zhang et al. |
| 11,105,266 B2 | 8/2021 | Zhou et al. |
| 11,125,156 B2 | 9/2021 | Zhang et al. |
| 11,143,000 B2 | 10/2021 | Li et al. |
| 11,143,006 B1 | 10/2021 | Zhang et al. |
| 2004/0016245 A1 | 1/2004 | Pierson |
| 2004/0074238 A1 | 4/2004 | Wantanabe et al. |
| 2004/0076526 A1 | 4/2004 | Fukano et al. |
| 2004/0187950 A1 | 9/2004 | Cohen et al. |
| 2004/0219040 A1 | 11/2004 | Kugelev et al. |
| 2005/0051322 A1 | 3/2005 | Speer |
| 2005/0139286 A1 | 6/2005 | Poulter |
| 2005/0196298 A1 | 9/2005 | Manning |
| 2005/0226754 A1 | 10/2005 | Orr et al. |
| 2005/0274134 A1 | 12/2005 | Ryu et al. |
| 2006/0061091 A1 | 3/2006 | Osterloh |
| 2006/0062914 A1 | 3/2006 | Garg et al. |
| 2006/0196251 A1* | 9/2006 | Richey ............... G01M 3/2815 73/49.1 |
| 2006/0211356 A1 | 9/2006 | Grassman |
| 2006/0260331 A1 | 11/2006 | Andreychuk |
| 2007/0029090 A1 | 2/2007 | Andreychuk et al. |
| 2007/0066406 A1 | 3/2007 | Keller et al. |
| 2007/0107981 A1 | 5/2007 | Sicotte |
| 2007/0125544 A1 | 6/2007 | Robinson et al. |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0006089 A1 | 1/2008 | Adnan et al. |
| 2008/0098891 A1 | 5/2008 | Feher |
| 2008/0161974 A1 | 7/2008 | Alston |
| 2008/0264625 A1 | 10/2008 | Ochoa |
| 2008/0264649 A1 | 10/2008 | Crawford |
| 2009/0064685 A1 | 3/2009 | Busekros et al. |
| 2009/0068031 A1 | 3/2009 | Gambier et al. |
| 2009/0092510 A1 | 4/2009 | Williams et al. |
| 2009/0124191 A1 | 5/2009 | Van Becelaere et al. |
| 2010/0019626 A1 | 1/2010 | Stout et al. |
| 2010/0071899 A1 | 3/2010 | Coquilleau et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0052423 A1 | 3/2011 | Gambier et al. |
| 2011/0054704 A1 | 3/2011 | Karpman et al. |
| 2011/0085924 A1 | 4/2011 | Shampine et al. |
| 2011/0146244 A1 | 6/2011 | Farman et al. |
| 2011/0146246 A1 | 6/2011 | Farman et al. |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0048242 A1 | 3/2012 | Sumilla et al. |
| 2012/0137699 A1 | 6/2012 | Montagne et al. |
| 2012/0179444 A1 | 7/2012 | Ganguly et al. |
| 2012/0192542 A1 | 8/2012 | Chillar et al. |
| 2012/0199001 A1 | 8/2012 | Chillar et al. |
| 2012/0204627 A1 | 8/2012 | Anderl et al. |
| 2012/0255734 A1 | 10/2012 | Coli et al. |
| 2012/0310509 A1 | 12/2012 | Pardo et al. |
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0189915 A1 | 7/2013 | Hazard |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0010671 A1 | 1/2014 | Cryer et al. |
| 2014/0013768 A1 | 1/2014 | Laing et al. |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0123621 A1 | 5/2014 | Driessens et al. |
| 2014/0130422 A1 | 5/2014 | Laing et al. |
| 2014/0138079 A1 | 5/2014 | Broussard et al. |
| 2014/0144641 A1 | 5/2014 | Chandler |
| 2014/0147291 A1 | 5/2014 | Burnette |
| 2014/0158345 A1 | 6/2014 | Jang et al. |
| 2014/0196459 A1 | 7/2014 | Futa et al. |
| 2014/0216736 A1 | 8/2014 | Leugemors et al. |
| 2014/0219824 A1 | 8/2014 | Burnette |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0217672 A1 | 8/2015 | Shampine et al. |
| 2015/0226140 A1 | 8/2015 | Zhang et al. |
| 2015/0252661 A1 | 9/2015 | Glass |
| 2015/0275891 A1 | 10/2015 | Chong et al. |
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1 | 2/2016 | Broussard et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0122310 A1 | 5/2017 | Ladron de Guevara |
| 2017/0145918 A1 | 5/2017 | Oehring et al. |

(56) References Cited

U.S. PATENT DOCUMENTS

| | | |
|---|---|---|
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0248034 A1 | 8/2017 | Dzieciol et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0322086 A1 | 11/2017 | Luharuka |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Cram |
| 2018/0038216 A1 | 3/2018 | Zhang et al. |
| 2018/0058171 A1 | 3/2018 | Roesner et al. |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevag et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0048993 A1 | 2/2019 | Akiyama et al. |
| 2019/0063263 A1 | 2/2019 | Davis et al. |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick et al. |
| 2019/0154020 A1 | 5/2019 | Glass |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211661 A1 | 7/2019 | Reckies et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277279 A1 | 9/2019 | Byrne et al. |
| 2019/0277295 A1 | 9/2019 | Clyburn et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0356199 A1 | 11/2019 | Morris et al. |
| 2019/0376449 A1 | 12/2019 | Carrell |
| 2020/0003205 A1 | 1/2020 | Stokkevåg et al. |
| 2020/0011165 A1 | 1/2020 | George et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0132058 A1 | 4/2020 | Mollatt |
| 2020/0141219 A1 | 5/2020 | Oehring et al. |
| 2020/0141907 A1 | 5/2020 | Meek et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0340322 A1 | 12/2020 | Sizemore et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |

(56) References Cited

U.S. PATENT DOCUMENTS

| | | |
|---|---|---|
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |
| 2021/0025324 A1 | 1/2021 | Morris et al. |
| 2021/0025383 A1 | 1/2021 | Bodishbaugh et al. |
| 2021/0054727 A1 | 2/2021 | Floyd |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0079758 A1 | 3/2021 | Yeung et al. |
| 2021/0079851 A1 | 3/2021 | Yeung et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0199110 A1 | 7/2021 | Albert et al. |
| 2021/0222690 A1 | 7/2021 | Beisel |
| 2021/0246774 A1 | 8/2021 | Cui et al. |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0306720 A1 | 9/2021 | Sandoval et al. |
| 2021/0308638 A1 | 10/2021 | Zhong et al. |
| 2021/0355927 A1 | 11/2021 | Jian et al. |
| 2021/0372395 A1 | 12/2021 | Li et al. |
| 2021/0388760 A1 | 12/2021 | Feng et al. |

FOREIGN PATENT DOCUMENTS

| | | |
|---|---|---|
| CA | 2043184 | 8/1994 |
| CA | 2829762 | 9/2012 |
| CA | 2876687 A1 | 5/2014 |
| CA | 2693567 | 9/2014 |
| CA | 2876687 C | 4/2019 |
| CA | 2919175 | 3/2021 |
| CN | 2622404 | 6/2004 |
| CN | 2779054 | 5/2006 |
| CN | 2890325 | 4/2007 |
| CN | 200964929 Y | 10/2007 |
| CN | 101323151 A | 12/2008 |
| CN | 201190660 Y | 2/2009 |
| CN | 201190892 Y | 2/2009 |
| CN | 201190893 Y | 2/2009 |
| CN | 101414171 A | 4/2009 |
| CN | 201215073 Y | 4/2009 |
| CN | 201236650 Y | 5/2009 |
| CN | 201275542 Y | 7/2009 |
| CN | 201275801 Y | 7/2009 |
| CN | 201333385 Y | 10/2009 |
| CN | 201443300 U | 4/2010 |
| CN | 201496415 U | 6/2010 |
| CN | 201501365 U | 6/2010 |
| CN | 201507271 U | 6/2010 |
| CN | 101323151 B | 7/2010 |
| CN | 201560210 U | 8/2010 |
| CN | 201581862 U | 9/2010 |
| CN | 201610728 U | 10/2010 |
| CN | 201610751 U | 10/2010 |
| CN | 201618530 U | 11/2010 |
| CN | 201661255 U | 12/2010 |
| CN | 101949382 | 1/2011 |
| CN | 201756927 U | 3/2011 |
| CN | 101414171 B | 5/2011 |
| CN | 102128011 A | 7/2011 |
| CN | 102140898 A | 8/2011 |
| CN | 102155172 A | 8/2011 |
| CN | 102182904 | 9/2011 |
| CN | 202000930 U | 10/2011 |
| CN | 202055781 U | 11/2011 |
| CN | 202082265 U | 12/2011 |
| CN | 202100216 U | 1/2012 |
| CN | 202100217 U | 1/2012 |
| CN | 202100815 U | 1/2012 |
| CN | 202124340 U | 1/2012 |
| CN | 202140051 U | 2/2012 |
| CN | 202140080 U | 2/2012 |
| CN | 202144789 U | 2/2012 |
| CN | 202144943 U | 2/2012 |
| CN | 202149354 U | 2/2012 |
| CN | 102383748 A | 3/2012 |
| CN | 202156297 U | 3/2012 |
| CN | 202158355 U | 3/2012 |
| CN | 202163504 U | 3/2012 |
| CN | 202165236 U | 3/2012 |
| CN | 202180866 U | 4/2012 |
| CN | 202181875 U | 4/2012 |
| CN | 202187744 U | 4/2012 |
| CN | 202191854 U | 4/2012 |
| CN | 202250008 U | 5/2012 |
| CN | 101885307 | 7/2012 |
| CN | 102562020 A | 7/2012 |
| CN | 202326156 U | 7/2012 |
| CN | 202370773 U | 8/2012 |
| CN | 202417397 U | 9/2012 |
| CN | 202417461 U | 9/2012 |
| CN | 102729335 A | 10/2012 |
| CN | 202463955 U | 10/2012 |
| CN | 202463957 U | 10/2012 |
| CN | 202467739 U | 10/2012 |
| CN | 202467801 U | 10/2012 |
| CN | 202531016 U | 11/2012 |
| CN | 202544794 U | 11/2012 |
| CN | 102825039 A | 12/2012 |
| CN | 202578592 U | 12/2012 |
| CN | 202579164 U | 12/2012 |
| CN | 202594808 U | 12/2012 |
| CN | 202594928 U | 12/2012 |
| CN | 202596615 U | 12/2012 |
| CN | 202596616 U | 12/2012 |
| CN | 102849880 A | 1/2013 |
| CN | 102889191 A | 1/2013 |
| CN | 202641535 U | 1/2013 |
| CN | 202645475 U | 1/2013 |
| CN | 202666716 U | 1/2013 |
| CN | 202669645 U | 1/2013 |
| CN | 202669944 U | 1/2013 |
| CN | 202671336 U | 1/2013 |
| CN | 202673269 U | 1/2013 |
| CN | 202751982 U | 2/2013 |
| CN | 102963629 A | 3/2013 |
| CN | 202767964 U | 3/2013 |
| CN | 202789791 U | 3/2013 |
| CN | 202789792 U | 3/2013 |
| CN | 202810717 U | 3/2013 |
| CN | 202827276 U | 3/2013 |
| CN | 202833093 U | 3/2013 |
| CN | 202833370 U | 3/2013 |
| CN | 102140898 B | 4/2013 |
| CN | 202895467 U | 4/2013 |
| CN | 202926404 U | 5/2013 |
| CN | 202935798 U | 5/2013 |
| CN | 202935816 U | 5/2013 |
| CN | 202970631 U | 6/2013 |
| CN | 103223315 A | 7/2013 |
| CN | 203050598 U | 7/2013 |
| CN | 103233714 A | 8/2013 |
| CN | 103233715 A | 8/2013 |
| CN | 103245523 A | 8/2013 |
| CN | 103247220 A | 8/2013 |

(56) References Cited

FOREIGN PATENT DOCUMENTS

| | | | |
|---|---|---|---|
| CN | 103253839 | A | 8/2013 |
| CN | 103277290 | A | 9/2013 |
| CN | 103321782 | A | 9/2013 |
| CN | 203170270 | U | 9/2013 |
| CN | 203172509 | U | 9/2013 |
| CN | 203175778 | U | 9/2013 |
| CN | 203175787 | U | 9/2013 |
| CN | 102849880 | B | 10/2013 |
| CN | 203241231 | U | 10/2013 |
| CN | 203244941 | U | 10/2013 |
| CN | 203244942 | U | 10/2013 |
| CN | 203303798 | U | 11/2013 |
| CN | PCT/CN2012/074945 | | 11/2013 |
| CN | 102155172 | B | 12/2013 |
| CN | 102729335 | B | 12/2013 |
| CN | 103420532 | A | 12/2013 |
| CN | 203321792 | U | 12/2013 |
| CN | 203412658 | | 1/2014 |
| CN | 203420697 | U | 2/2014 |
| CN | 203480755 | U | 3/2014 |
| CN | 103711437 | A | 4/2014 |
| CN | 203531815 | U | 4/2014 |
| CN | 203531871 | U | 4/2014 |
| CN | 203531883 | U | 4/2014 |
| CN | 203556164 | U | 4/2014 |
| CN | 203558809 | U | 4/2014 |
| CN | 203559861 | U | 4/2014 |
| CN | 203559893 | U | 4/2014 |
| CN | 203560189 | U | 4/2014 |
| CN | 102704870 | B | 5/2014 |
| CN | 203611843 | U | 5/2014 |
| CN | 203612531 | U | 5/2014 |
| CN | 203612843 | U | 5/2014 |
| CN | 203614062 | U | 5/2014 |
| CN | 203614388 | U | 5/2014 |
| CN | 203621045 | U | 6/2014 |
| CN | 203621046 | U | 6/2014 |
| CN | 203621051 | U | 6/2014 |
| CN | 203640993 | U | 6/2014 |
| CN | 203655221 | U | 6/2014 |
| CN | 103899280 | A | 7/2014 |
| CN | 103923670 | A | 7/2014 |
| CN | 203685052 | U | 7/2014 |
| CN | 203716936 | U | 7/2014 |
| CN | 103990410 | A | 8/2014 |
| CN | 103993869 | A | 8/2014 |
| CN | 203754009 | U | 8/2014 |
| CN | 203754025 | U | 8/2014 |
| CN | 203754341 | U | 8/2014 |
| CN | 203756614 | U | 8/2014 |
| CN | 203770264 | U | 8/2014 |
| CN | 203784519 | U | 8/2014 |
| CN | 203784520 | U | 8/2014 |
| CN | 104057864 | A | 9/2014 |
| CN | 203819819 | U | 9/2014 |
| CN | 203823431 | U | 9/2014 |
| CN | 203835337 | U | 9/2014 |
| CN | 104074500 | A | 10/2014 |
| CN | 203876633 | U | 10/2014 |
| CN | 203876636 | U | 10/2014 |
| CN | 203877364 | U | 10/2014 |
| CN | 203877365 | U | 10/2014 |
| CN | 203877375 | U | 10/2014 |
| CN | 203877424 | U | 10/2014 |
| CN | 203879476 | U | 10/2014 |
| CN | 203879479 | U | 10/2014 |
| CN | 203890292 | U | 10/2014 |
| CN | 203899476 | U | 10/2014 |
| CN | 203906206 | U | 10/2014 |
| CN | 104150728 | A | 11/2014 |
| CN | 104176522 | A | 12/2014 |
| CN | 104196464 | A | 12/2014 |
| CN | 104234651 | A | 12/2014 |
| CN | 203971841 | U | 12/2014 |
| CN | 203975450 | U | 12/2014 |
| CN | 204020788 | U | 12/2014 |
| CN | 204021980 | U | 12/2014 |
| CN | 204024625 | U | 12/2014 |
| CN | 204051401 | U | 12/2014 |
| CN | 204060661 | U | 12/2014 |
| CN | 104260672 | A | 1/2015 |
| CN | 104314512 | A | 1/2015 |
| CN | 204077478 | U | 1/2015 |
| CN | 204077526 | U | 1/2015 |
| CN | 204078307 | U | 1/2015 |
| CN | 204083051 | U | 1/2015 |
| CN | 204113168 | U | 1/2015 |
| CN | 104340682 | A | 2/2015 |
| CN | 104358536 | A | 2/2015 |
| CN | 104369687 | A | 2/2015 |
| CN | 104402178 | A | 3/2015 |
| CN | 104402185 | A | 3/2015 |
| CN | 104402186 | A | 3/2015 |
| CN | 204209819 | U | 3/2015 |
| CN | 204224560 | U | 3/2015 |
| CN | 204225813 | U | 3/2015 |
| CN | 204225839 | U | 3/2015 |
| CN | 104533392 | A | 4/2015 |
| CN | 104563938 | A | 4/2015 |
| CN | 104563994 | A | 4/2015 |
| CN | 104563995 | A | 4/2015 |
| CN | 104563998 | A | 4/2015 |
| CN | 104564033 | A | 4/2015 |
| CN | 204257122 | U | 4/2015 |
| CN | 204283610 | U | 4/2015 |
| CN | 204283782 | U | 4/2015 |
| CN | 204297682 | U | 4/2015 |
| CN | 204299810 | U | 4/2015 |
| CN | 103223315 | B | 5/2015 |
| CN | 104594857 | A | 5/2015 |
| CN | 104595493 | A | 5/2015 |
| CN | 104612647 | A | 5/2015 |
| CN | 104612928 | A | 5/2015 |
| CN | 104632126 | A | 5/2015 |
| CN | 204325094 | U | 5/2015 |
| CN | 204325098 | U | 5/2015 |
| CN | 204326983 | U | 5/2015 |
| CN | 204326985 | U | 5/2015 |
| CN | 204344040 | U | 5/2015 |
| CN | 204344095 | U | 5/2015 |
| CN | 104727797 | A | 6/2015 |
| CN | 204402414 | U | 6/2015 |
| CN | 204402423 | U | 6/2015 |
| CN | 204402450 | U | 6/2015 |
| CN | 103247220 | B | 7/2015 |
| CN | 104803568 | A | 7/2015 |
| CN | 204436360 | U | 7/2015 |
| CN | 204457524 | U | 7/2015 |
| CN | 204472485 | U | 7/2015 |
| CN | 204473625 | U | 7/2015 |
| CN | 204477303 | U | 7/2015 |
| CN | 204493095 | U | 7/2015 |
| CN | 204493309 | U | 7/2015 |
| CN | 103253839 | B | 8/2015 |
| CN | 104820372 | A | 8/2015 |
| CN | 104832093 | A | 8/2015 |
| CN | 104863523 | A | 8/2015 |
| CN | 204552723 | U | 8/2015 |
| CN | 204553866 | U | 8/2015 |
| CN | 204571831 | U | 8/2015 |
| CN | 204703814 | U | 10/2015 |
| CN | 204703833 | U | 10/2015 |
| CN | 204703834 | U | 10/2015 |
| CN | 105092401 | A | 11/2015 |
| CN | 103233715 | B | 12/2015 |
| CN | 103790927 | | 12/2015 |
| CN | 105207097 | | 12/2015 |
| CN | 204831952 | U | 12/2015 |
| CN | 204899777 | U | 12/2015 |
| CN | 102602323 | | 1/2016 |
| CN | 105240064 | A | 1/2016 |
| CN | 204944834 | | 1/2016 |
| CN | 205042127 | U | 2/2016 |
| CN | 205172478 | U | 4/2016 |

(56) References Cited

FOREIGN PATENT DOCUMENTS

| | | | |
|---|---|---|---|
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108799473 | 11/2018 |
| CN | 108868675 A | 11/2018 |
| CN | 208086829 | 11/2018 |
| CN | 208089263 | 11/2018 |
| CN | 208169068 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208253147 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |

(56) References Cited

FOREIGN PATENT DOCUMENTS

| | | |
|---|---|---|
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 A | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4004854 | 8/1991 |
| DE | 4241614 | 6/1994 |
| DE | 102012018825 | 3/2014 |
| DE | 102013111655 | 12/2014 |
| DE | 102015103872 | 10/2015 |
| DE | 102013114335 | 12/2015 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3049642 | 4/2018 |
| EP | 3354866 | 8/2018 |
| EP | 3075946 | 5/2019 |
| FR | 2795774 | 6/1999 |
| GB | 474072 | 10/1937 |
| GB | 1438172 | 6/1976 |
| JP | S57135212 | 2/1984 |
| KR | 20020026398 | 4/2002 |
| RU | 13562 | 4/2000 |
| WO | 1993020328 | 10/1993 |
| WO | 2006025886 | 3/2006 |
| WO | 2009023042 | 2/2009 |
| WO | 20110133821 | 10/2011 |
| WO | 2012139380 | 10/2012 |
| WO | 2013158822 | 10/2013 |

(56) References Cited

FOREIGN PATENT DOCUMENTS

| | | |
|---|---|---|
| WO | 2013185399 | 12/2013 |
| WO | 2015158020 | 10/2015 |
| WO | 2016/014476 | 1/2016 |
| WO | 2016033983 | 3/2016 |
| WO | 2016078181 | 5/2016 |
| WO | 2016101374 | 6/2016 |
| WO | 2016112590 | 7/2016 |
| WO | 2017123656 A | 7/2017 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018156131 | 8/2018 |
| WO | 2018075034 | 10/2018 |
| WO | 2018187346 | 10/2018 |
| WO | 2018031031 | 2/2019 |
| WO | 2019045691 | 3/2019 |
| WO | 2019046680 | 3/2019 |
| WO | 2019060922 | 3/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 | 6/2020 |
| WO | 2020211083 | 10/2020 |
| WO | 2020211086 | 10/2020 |
| WO | 2021041783 | 3/2021 |

OTHER PUBLICATIONS

American Petroleum Institute. API 674: Positive Displacement Pumps—Reciprocating. 3rd ed. Washington, DC: API Publishing Services, 2010.

American Petroleum Institute. API 616: Gas Turbines for the Petroleum, Chemical, and Gas Industry Services. 5th ed. Washington, DC: API Publishing Services, 2011.

Karassik, Igor, Joseph Messina, Paul Cooper, and Charles Heald. Pump Handbook. 4th ed. New York: McGraw-Hill Education, 2008.

Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.

The Weir Group, Inc. Weir SPM Pump Product Catalog. Ft. Worth, TX: S.P.M. Flow Control, Inc. Oct. 30, 2017. https://manage.global.weir/assets/files/product%20brochures/SPM_2P140706_Pump_Product_Catalogue_View.pdf.

Shandong Saigao Group Corporation. Q4 (5W115) Quintuplex Plunger Pump. Jinan City, Shandong Province, China: Saigao. Oct. 20, 2014. https://www.saigaogroup.com/product/q400-5w115-quintuplex-plunger-pump.html.

Marine Turbine. Turbine Powered Frac Units. Franklin, Louisiana: Marine Turbine Technologies, 2020.

Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.

CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.

Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.

SPM® QEM 5000 E-Frac Pump Specification Sheet, Weir Group (2019) ("Weir 5000").

Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").

Dowell B908 "Turbo-Jet" Operator's Manual.

Jereh Debut's Super power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.

Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www.prnewswire.com/news-releases/jereh-apollo-4500-turbine-frac-pumper-finishes-successful-field-operation-in-china-300035829.html.

35% Economy Increase, Dual-fuel System Highlighting Jereh Apollo Frac Pumper, Jereh Group (Apr. 13, 2015), https://www.jereh.com/en/news/press-release/news-detail-7345.htm.

Hydraulic Fracturing: Gas turbine proves successful in shale gasfield operations, Vericor (2017), https://www vericor.com/wp-content/uploads/2020/02/7.-Fracing-4500hp-Pump-China-En.pdf ("Vericor Case Study").

Jereh Apollo Turbine Fracturing Pumper Featured on China Central Television, Jereh Group (Mar. 9, 2018), https://www.jereh.com/en/news/press-release/news-detail-7267.htm.

Jereh Unveiled New Electric Fracturing Solution at OTC 2019, Jereh Group (May 7, 2019), as available on May 28, 2019, https://web.archive.org/web/20190528183906/https://www.prnewswire.com/news-releases/jereh-unveiled-new-electric-fracturing-solution-at-otc-2019-300845028.html.

Jereh Group, Jereh Fracturing Unit, Fracturing Spread, YouTube (Mar. 30, 2015), https://www.youtube.com/watch?v=PlkDbU5dE0o.

Transcript of Jereh Group, Jereh Fracturing Unit, Fracturing Spread, YouTube (Mar. 30, 2015).

Jereh Group, Jereh Fracturing Equipment. YouTube (Jun. 8, 2015), https://www.youtube.com/watch?v=m0vMiq84P4Q.

Transcript of Jereh Group, Jereh Fracturing Equipment, YouTube (Jun. 8, 2015), https://www.youtube.com/watch?v=m0vMiq84P4Q.

Ferdinand P. Beer et al., Mechanics of Materials (6th ed. 2012).

Weir Oil & Gas Introduces Industry's First Continuous Duty 5000-Horsepower Pump, Weir Group (Jul. 25, 2019), https://www.global.weir/newsroom/news-articles/weir-oil-and-gas-introduces-industrys-first-continuous-duty-5000-horsepower-pump/.

2012 High Horsepower Summit Agenda, Natural Gas for High Horsepower Applications (Sep. 5, 2012).

Review of HHP Summit 2012, Gladstein, Neandross & Associates https://www.gladstein.org/gna-conferences/high-horsepower-summit-2012/.

Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.

Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.co m/news/oil-gas/a/124883/Turbine_Technology_Powers_Green_Field_MultiFuel_Frack_Pump.

"Turbine Frac Units," WMD Squared (2012), https://wmdsquared.com/ work/gfes-turbine-frac-units/.

(56) References Cited

OTHER PUBLICATIONS

Leslie Turj, Green Field asset sale called 'largest disposition industry has seen,' The INDsider Media (Mar. 19, 2014), http://theind.com/article-16497-green-field-asset-sale-called-%E2%80%98largest-disposition-industry-has-seen%60.html.
Europump and Hydrualic Institute, Variable Speed Pumping: A Guide to Successful Applications, Elsevier Ltd, 2004.
Capstone Turbine Corporation, Capstone Receives Three Megawatt Order from Large Independent Oil & Gas Company in Eagle Ford Shale Play, Dec. 7, 2010.
Wikipedia, Westinghouse Combustion Turbine Systems Division, https://en.wikipedia.org/wiki/Westinghouse_Combustion_Turbine_Systems_Division, circa 1960.
Wikipedia,Union Pacific GTELs, https://en.wikipedia.org/wiki/Union_Pacific_GTELs, circa 1950.
HCI JET Frac, Screenshots from YouTube, Dec. 11, 2010. https://www.youtube.com/watch?v=6HjXkdbFaFQ.
ADS Petroleum Ltd., Automated Hot Zone, Frac Refueling System, Dec. 2018.
Eygun, Christiane, et al., URTeC: 2687987, Mitigating Shale Gas Developments Carbon Footprint: Evaluating and Implementing Solutions in Argentina, Copyright 2017, Unconventional Resources Technology Conference.
Nalzel, Brian, Hart Energy, Oil, Gas Industry Discovers Innovative Solutions to Environmental Concerns, Dec. 10, 2018.
Frac Shack, Bi-Fuel FracFueller brochure, 2011.
Pettigrew, Dana, et al., High Pressure Multi-Stage Centrifugal Pump for 10,000 psi Frac Pump-HPHPS FRAC Pump, Copyright 2013, Society of Petroleum Engineers, SPE 166191.
Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.
Wallace, E.M., Associated Shale Gas: From Flares to Rig Power, Copyright 2015, Society of Petroleum Engineers, SPE-173491-MS.
Williams, C.W. (Gulf Oil Corp. Odessa Texas), The Use of Gas-turbine Engines in an Automated High-Pressure Water-Injection Stations; American Petroleum Institute; API-63-144 (Jan. 1, 1963).
Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).
Porter, John A. (SOLAR Division International Harvester Co.), Modern Industrial Gas Turbines for the Oil Field; American Petroleum Institute; Drilling and Production Practice; API-67-243 (Jan. 1, 1967).
Cooper et al., Jet Frac Porta-Skid—A New Concept in Oil Field Service Pump Equipments[sic]; Halliburton Services; SPE-2706 (1969).
Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).
Kas'yanov et al., Application of gas-turbine engines in pumping units complexes of hydraulic fracturing of oil and gas reservoirs; Exposition Oil & Gas; (Oct. 2012) (published in Russian).
ISM, What is Cracking Pressure, 2019.
Swagelok, The right valve for controlling flow direction? Check, 2016.
Technology.org, Check valves how do they work and what are the main type, 2018.
de Gevigney et al., "Analysis of no-load dependent power losses in a planetary gear train by using thermal network method", International Gear Conference 2014: Aug. 26-28, 2014, Lyon, pp. 615-624.
Researchgate, Answer by Byron Woolridge, found at https://www.researchgate.net/post/How_can_we_improve_the_efficiency_of_the_gas_turbine_cycles, Jan. 1, 2013.
Filipović, Ivan, Preliminary Selection of Basic Parameters of Different Torsional Vibration Dampers Intended for use in Medium-Speed Diesel Engines, Transactions of Famena XXXVI-3 (2012).

Marine Turbine Technologies, 1 MW Power Generation Package, http://marineturbine.com/power-generation, 2017.
Business Week: Fiber-optic cables help fracking, cablinginstall.com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
Plos One, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Gardner Denver Hydraulic Fracturing Pumps GD 3000 https://wwwgardnerdenver.com/en-us/pumps/tnplex-fracking-pump-gd-3000.
Lekontsev, Yu M., et al. "Two-side sealer operation." Journal of Mining Science 49.5 (2013): 757-762.
Tom Hausfeld, GE Power & Water, and Eldon Schelske, Evolution Well Services, TM2500+ Power tor Hydraulic Fracturing.
FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNG, Natural Gas Fuel for Drilling and Hydraulic Fracturing, Diesel Displacement / Dual Fuel & Bi-Fuel, May 2014.
Integrated Flow, Skid-mounted Modular Process Systems, Jul. 15, 2017, https://ifsolutions.com/why-modular/.
Cameron, A Schlumberger Company, Frac Manifold Systems, 2016.
ZSi-Foster, Energy | Solar | Fracking | Oil and Gas, Aug. 2020, https://www.zsi-foster.com/energy-solar-fracking-oil-and-gas.html.
JBG Enterprises, Inc., WS-Series Blowout Prevention Safety Coupling—Quick Release Couplings, Sep. 11, 2015, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan plant (Korea) beats fuel flexibility records with over 95% hydrogen in process gas." Proceedings of PowerGen Asia Conference, Singapore. 1999.
Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., Electric Power Generation Potential Based on Waste Heat and Geothermal Resources in South Africa, pangea.stanford.edu (Feb. 11, 2019).

(56) References Cited

OTHER PUBLICATIONS

Department of Energy, United States of America, The Water-Energy Nexus: Challenges and Opportunities ourenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al.. Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia, Nov. 3, 2012.
Blago Minovski, Coupled Simulations of Cooling and Engine Systems for Unsteady Analysis of the Benefits of Thermal Engine Encapsulation, Department of Applied Mechanics, Chalmers University of Technology Göteborg, Sweden 2015.
J. Porteiro et al., Feasibility of a new domestic CHP trigeneration with heat pump: II. Availability analysis. Design and development. Applied Thermal Engineering 24 (2004) 1421-1429.
Special-Purpose Couplings for Petroleum, Chemical, and Gas Industry Services, API Standard 671 (4th Edition) (2010).
The Application of Flexible Couplings for Turbomachinery, Jon R.Mancuso et al., Proceedings of the Eighteenthturbomachinery Symposium (1989).
Pump Control With Variable Frequency Drives, Kevin Tory, Pumps & Systems: Advances in Motors and Drives, Reprint from Jun. 2008.
Fracture Design and Stimulation, Mike Eberhard, P.E., Wellconstruction & Operations Technical Workshop Insupport of the EPA Hydraulic Fracturing Study, Mar. 10-11, 2011.
General Purpose vs. Special Purpose Couplings, Jon Mancuso, Proceedings of the Twenty-Third Turbomachinerysymposium (1994).
Overview of Industry Guidance/Best Practices on Hydraulic Fracturing (HF), American Petroleum Institute, © 2012.
API Member Companies, American Petroleum Institute, WaybackMachine Capture, https://web.archive.org/web/20130424080625/http://api.org/globalitems/globalheaderpages/membership/api-member-companies, accessed Jan. 4, 2021.
API's Global Industry Services, American Petroleum Institute, © Aug. 2020.
About API, American Petroleum Institute, https://www.api.org /about, accessed Dec. 30, 2021.
About API, American Petroleum Institute, WaybackMachine Capture, https://web.archive.org/web/20110422104346 /http://api.org/aboutapi/, captured Apr. 22, 2011.
Publications, American Petroleum Institute, WaybackMachine Capture, https://web.archive.org/web/20110427043936 /http://www.api.org:80/Publications/, captured Apr. 27, 2011.
Procedures for Standards Development, American Petroleum Institute, Third Edition (2006).
WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat.org/title/special-purpose-couplings-for-petroleum-chemical-and-gas-industry-services/oclc/871254217&referer=brief_results, accessed Dec. 22, 2021.
2011 Publications and Services, American Petroleum Institute (2011).
Standards, American Petroleum Institute, WaybackMachine Capture, https://web.archive.org/web/20110207195046/http:/www.api.org/Standards/, captured Feb. 7, 2011; and https://web.archive.org/web/20110204112554/http://global.ihs.com/?RID=API1, captured Feb. 4, 2011.
IHS Markit Standards Store, https://global.ihs.com/doc_ detail.cfm?document_name=API%20STD%20674&item_s_key=00010672#doc-detail-history-anchor, accessed Dec. 30, 2021; and https://global.ihs.com/doc_detail.cfm?&input_doc_number=671 &input_doc_title=&document_name=API%20STD%20671&item_s_key=00010669 &item_key_date=890331&origin=DSSC, accessed Dec. 30, 2021.
"Honghua developing new-generation shale-drilling rig, plans testing of frac pump"; Katherine Scott; Drilling Contractor; May 23, 2013; accessed at https://www.drillingcontractor.org/honghua-developing-new-generation-shale-drilling-rig-plans-testing-of-frac-pump-23278.

* cited by examiner

FUEL, COMMUNICATIONS, AND POWER CONNECTION METHODS

PRIORITY CLAIM

This is a continuation of U.S. Non-Provisional application Ser. No. 15/929,708, filed May 18, 2020, titled "FUEL, COMMUNICATIONS, AND POWER CONNECTION SYSTEMS AND RELATED METHODS," which claims priority to and the benefit of U.S. Provisional Application No. 62/900,100, filed Sep. 13, 2019, titled "ON BOARDING HOSES AND ELECTRICAL CONNECTIONS", U.S. Provisional Application No. 62/900,112, filed Sep. 13, 2019, titled "FUEL LINE CONNECTION SYSTEM AND METHODS FOR SAME", and U.S. Provisional Application No. 62/704,401, filed May 8, 2020, titled "FUEL, COMMUNICATIONS, AND POWER CONNECTION SYSTEMS AND RELATED METHODS", the entire disclosures of all of which are incorporated herein by reference.

TECHNICAL FIELD

The present disclosure relates to systems and methods for supplying fuel, enabling communications, and/or conveying electric power to machines, and more particularly, to systems and methods for supplying fuel, enabling communications, and/or conveying electric power to a plurality of hydraulic fracturing units.

BACKGROUND

Fracturing is an oilfield operation that stimulates production of hydrocarbons, such that the hydrocarbons may more easily or readily flow from a subsurface formation to a well. For example, a fracturing system may be configured to fracture a formation by pumping a fracking fluid into a well at high pressure and high flow rates. Some fracking fluids may take the form of a slurry including water, proppants, and/or other additives, such as thickening agents and/or gels. The slurry may be forced via one or more pumps into the formation at rates faster than can be accepted by the existing pores, fractures, faults, or other spaces within the formation. As a result, pressure builds rapidly to the point where the formation fails and begins to fracture. By continuing to pump the fracking fluid into the formation, existing fractures in the formation are caused to expand and extend in directions farther away from a well bore, thereby creating flow paths to the well bore. The proppants may serve to prevent the expanded fractures from closing when pumping of the fracking fluid is ceased or may reduce the extent to which the expanded fractures contract when pumping of the fracking fluid is ceased. Once the formation is fractured, large quantities of the injected fracking fluid are allowed to flow out of the well, and the production stream of hydrocarbons may be obtained from the formation.

A fracturing system includes a large number of separate components required for executing a fracturing operation, each of which must be transported to the fracturing site in an at least partially disassembled state, assembled, and provided with a supply of fuel and electricity for operation, as well as data communications links for controlling the operation. Providing fuel delivery lines, communications links, and electric power to and between the numerous components when setting-up the fracturing operation requires a significant number of skilled personnel, numerous tools, and a substantial amount of time, all contributing significantly to the cost of the fracturing operation. Following completion of the fracturing operation, the components must be broken-down and transported from the fracturing site to another fracturing site. Thus, significant time and cost are involved with setting-up and tearing-down the fracturing operation. In addition, depending on the requirements of a particular operation and the site on which it occurs, different a fracturing operations may require different components and arrangements, which may add complexity to setting-up and tearing-down the fracturing operation, further adding to the time and costs associated with the fracturing operation.

Accordingly, it can be seen that a need exists for systems and methods that provide greater efficiency when setting-up and tearing-down components associated with a fracturing operation. The present disclosure may address one or more of the above-referenced drawbacks, as well as other possible drawbacks.

SUMMARY

The present disclosure is generally directed to systems and methods for supplying fuel, enabling communications, and/or conveying electric power to machines, and more particularly, to a plurality of hydraulic fracturing units associated with a hydraulic fracturing system. For example, in some embodiments, a fuel line connection assembly for providing flow communication between a fuel source and a first gas turbine engine of a plurality of gas turbine engines may include a manifold line defining an inlet end, an outlet end, and a flow path for fuel extending between the inlet end and the outlet end. The fuel line connection assembly may further include an inlet coupling proximate the inlet end and configured to be connected to a fuel line providing flow communication with the fuel source, and an outlet coupling proximate the outlet end and configured to be connected to one of an inlet end of another manifold line or a blocking device configured to prevent flow from the outlet end of the manifold line. The fuel line connection assembly may further include a distribution line connected to the manifold line and configured to provide flow communication between the manifold line and the first gas turbine engine, and a valve in one of the manifold line or the distribution line and configured to change between an open condition through which fluid flows and a closed condition preventing fluid flow. The valve may be configured to one of facilitate flow communication or prevent flow communication between the fuel source and the first gas turbine engine. The fuel line connection assembly may be configured to one of: (1) provide flow communication between a second gas turbine engine of the plurality of gas turbine engines upstream of the first gas turbine engine and a third gas turbine engine of the plurality of gas turbine engines downstream of the first gas turbine engine; or (2) provide flow communication solely between the fuel source and the first gas turbine engine.

According some embodiments, a fuel delivery system configured to supply fuel to a plurality of gas turbine engines connected to a plurality of pumps of a hydraulic fracturing system may include a plurality of fuel line connection assemblies. The fuel line connection assemblies may include a manifold line defining an inlet end, an outlet end, and a flow path for fuel extending between the inlet end and the outlet end. The fuel line connection assembly may also include an inlet coupling proximate the inlet end and configured to be connected to a fuel line providing flow communication with the fuel source, and an outlet coupling proximate the outlet end and configured to be connected to one of an inlet end of another manifold line or a blocking device configured to prevent flow from the outlet end of the manifold line. The fuel line connection assembly may also include a distribution line connected to the manifold line and configured to provide flow communication between the manifold line and the first gas turbine engine, and a valve in one of the manifold line or the distribution line and configured to change between an open condition through which fluid flows and a closed condition preventing fluid flow. The valve may be further configured to one of facilitate flow communication or prevent flow communication between the fuel source and the first gas turbine engine. A first fuel line connection assembly of the plurality of fuel line connection assemblies may be in flow communication with a first outlet coupling of the fuel source via an inlet coupling of the first fuel line connection assembly. A second fuel line connection assembly of the plurality of fuel line connection assemblies may be in flow communication with one of an outlet coupling of the first fuel line connection assembly or a second outlet coupling of the fuel source via an inlet coupling of the second fuel line connection assembly.

According to some embodiments, a method for pressure testing at least a portion of a fuel delivery system for supplying fuel from a fuel source to a plurality of gas turbine engines may include causing a first valve to be in an open condition. The first valve may be configured to one of facilitate flow communication or prevent flow communication between the fuel source and a first gas turbine engine of the plurality of gas turbine engines. The method may further include causing a second valve to be in a closed condition. The second valve may be configured to one of facilitate flow communication or prevent flow communication between a filter configured to filter one or more of particulates or liquids from fuel and the first gas turbine engine. The method may further include causing a third valve to be in an open condition. The third valve may be configured to one of facilitate flow communication or prevent flow communication between a pressure source and the filter. The method may further include increasing pressure via the pressure source in the at least a portion of the fuel delivery system, and monitoring a signal indicative of pressure in the at least a portion of the fuel delivery system. The method may also include, based at least in part on the signal, determining whether the at least a portion of the fuel delivery system has a leak.

According to some embodiments, a system for supplying fuel, enabling communications, and conveying electric power associated with operation of a hydraulic fracturing unit associated with a plurality of hydraulic fracturing units may include a fuel line connection assembly configured to be connected to the hydraulic fracturing unit and to supply fuel from a fuel source to a first gas turbine engine connected to the hydraulic fracturing unit. The fuel line connection assembly may include a manifold line defining an inlet end, an outlet end, and a flow path for fuel extending between the inlet end and the outlet end. The fuel connection assembly may also include a distribution line connected to the manifold line and configured to provide flow communication between the manifold line and the first gas turbine engine. The fuel line connection assembly may be configured to one of: (1) provide flow communication between one of the fuel source or a second gas turbine engine of the plurality of the hydraulic fracturing units upstream of the first gas turbine engine and a third gas turbine engine of the plurality of hydraulic fracturing units downstream of the first gas turbine engine; or (2) provide flow communication solely between the fuel source and the first gas turbine engine. The system may also include a communications cable assembly configured to be connected to the hydraulic fracturing unit and to enable data communications between the hydraulic fracturing unit and one of a data center remote from the hydraulic fracturing unit or a second hydraulic fracturing unit of the plurality of hydraulic fracturing units. The communications cable assembly may include a length of communications cable and a communications cable storage apparatus configured to be connected to the hydraulic fracturing unit, to store the length of communications cable when not in use, and to facilitate deployment of at least a portion of the length of communications cable for connection to the one of the data center or the second hydraulic fracturing unit. The system may also include a power cable assembly configured to be connected to the hydraulic fracturing unit and to convey electric power between the hydraulic fracturing unit and one or more of a remote electrical power source or one or more of the plurality of hydraulic fracturing units. The power cable assembly may include a length of power cable and a power cable storage apparatus configured to be connected to the hydraulic fracturing unit, to store the length of power cable when not in use, and to facilitate deployment of at least a portion of the length of power cable for use.

According to some embodiments, a hydraulic fracturing unit may include a chassis, a pump connected to the chassis and configured to pump a fracturing fluid, and a first gas turbine engine connected to the chassis and configured to convert fuel into a power output for operating the pump. The hydraulic fracturing unit may also include a system for supplying fuel, enabling communications, and conveying electric power associated with operation of the hydraulic fracturing unit. The system may include a fuel line connection assembly connected to the hydraulic fracturing unit and configured to supply fuel from a fuel source to the first gas turbine engine connected to the chassis. The fuel line connection assembly may include a manifold line defining an inlet end, an outlet end, and a flow path for fuel extending between the inlet end and the outlet end. The fuel line connection assembly may also include a distribution line connected to the manifold line and configured to provide flow communication between the manifold line and the first gas turbine engine. The fuel line connection assembly may be configured to one of: (1) provide flow communication between one of the fuel source or a second gas turbine engine of a second hydraulic fracturing unit upstream of the first gas turbine engine and a third gas turbine engine of a hydraulic fracturing unit downstream of the first gas turbine engine; or (2) provide flow communication solely between the fuel source and the first gas turbine engine. The system may also include a communications cable assembly connected to the hydraulic fracturing unit and configured to enable data communications between the hydraulic fracturing unit and one of a data center remote from the hydraulic fracturing unit or an additional hydraulic fracturing unit. The communications cable assembly may include a length of communications cable and a communications cable storage apparatus connected to the hydraulic fracturing unit and configured to store the length of communications cable when not in use and to facilitate deployment of at least a portion of the length of communications cable for connection to the one of the data center or the another hydraulic fracturing unit. The system may also include a power cable assembly connected to the hydraulic fracturing unit and configured to convey electric power between the hydraulic fracturing unit and one or more of a remote electrical power source or one or more additional hydraulic fracturing units. The power cable assembly may include a length of power cable and a power cable storage apparatus connected to the hydraulic fracturing unit and configured to store the length of power cable when not in use and facilitate deployment of at least a portion of the length of power cable for use.

According to some embodiments, a hydraulic fracturing system may include a plurality of hydraulic fracturing units. The hydraulic fracturing system may include a main fuel line configured to supply fuel from a fuel source to a plurality of hydraulic fracturing units. The hydraulic fracturing system may also include a first hydraulic fracturing unit including a chassis, a pump connected to the chassis and configured to pump fracturing fluid, and a first gas turbine engine connected to the chassis and configured to convert fuel into a power output for operating the pump. The hydraulic fracturing system may also include a system for supplying fuel, enabling communications, and conveying electric power associated with operation of the first hydraulic fracturing unit. The system may include a fuel line connection assembly connected to the first hydraulic fracturing unit and configured to supply fuel from the fuel source to the first gas turbine engine. The fuel line connection assembly may include a manifold line defining an inlet end, an outlet end, and a flow path for fuel extending between the inlet end and the outlet end. The manifold line may be configured to provide at least a portion of a flow path for supplying fuel to the first gas turbine engine. The fuel line connection assembly may be configured to one of: (1) provide flow communication between one of the main fuel line or a second gas turbine engine of a second hydraulic fracturing unit upstream of the first gas turbine engine and a third gas turbine engine of a third hydraulic fracturing unit downstream of the first gas turbine engine; or (2) provide flow communication solely between the main fuel line and the first gas turbine engine. The system may also include a communications cable assembly including a length of communications cable connected to the first hydraulic fracturing unit and configured to enable data communications between the first hydraulic fracturing unit and one of a data center remote from the first hydraulic fracturing unit or one or more additional hydraulic fracturing units of the plurality of hydraulic fracturing units. The system may also include a power cable assembly including a length of power cable connected to the first hydraulic fracturing unit and configured to convey electric power between the first hydraulic fracturing unit and one or more of a remote electrical power source or one or more additional hydraulic fracturing units of the plurality of hydraulic fracturing units. The hydraulic fracturing system may also include a data center configured to one or more of transmit communications signals or receive communications signals. The communications signals may include data indicative of operation of one or more of the plurality of hydraulic fracturing units.

Still other aspects, embodiments, and advantages of these exemplary embodiments and embodiments, are discussed in detail below. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

DETAILED DESCRIPTION

Figure 1:
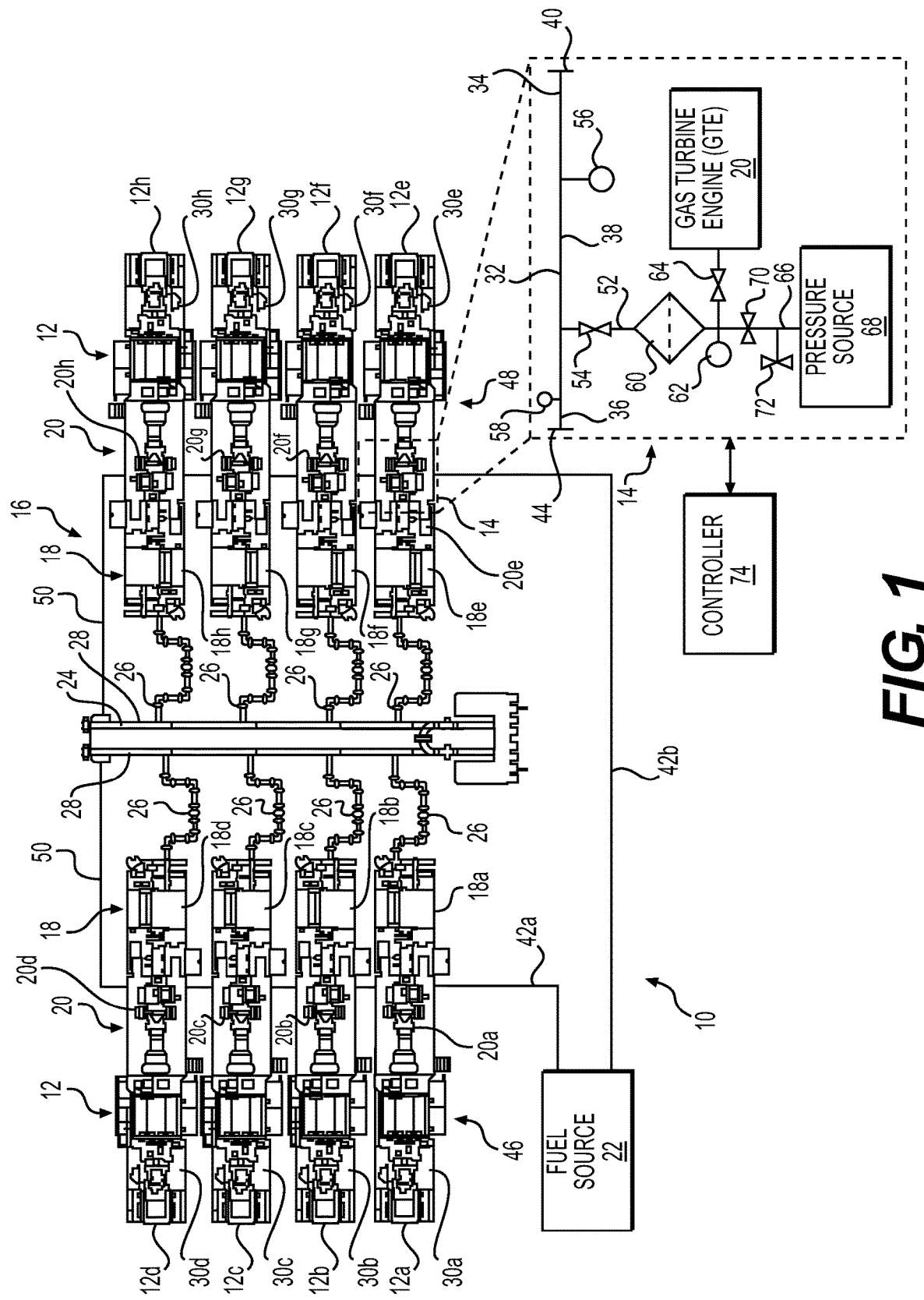
FIG. 1 schematically illustrates an example fuel delivery system for supplying fuel to a plurality of hydraulic fracturing units, including a detailed schematic view of an example fuel line connection assembly according to embodiments of the disclosure.

Referring now to the drawings in which like numerals indicate like parts throughout the several views, the following description is provided as an enabling teaching of exemplary embodiments, and those skilled in the relevant art will recognize that many changes can be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and can even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

FIG. 1 schematically illustrates an example fuel delivery system 10 for supplying fuel to a plurality of hydraulic fracturing units 12, including a detailed schematic view of an example fuel line connection assembly 14 according to embodiments of the disclosure. The fuel delivery system 10 may be part of a hydraulic fracturing system 16 that includes a plurality (or fleet) of hydraulic fracturing units 12 configured to pump a fracking fluid into a well at high pressure and high flow rates, so that a subterranean formation fails and begins to fracture in order to promote hydrocarbon production from the well.

In some examples, one or more of the hydraulic fracturing units 12 may include directly driven turbine (DDT) pumping units, in which pumps 18 are connected to one or more gas turbine engines (GTEs) 20 that supply power to the respective pump 18 for supplying fracking fluid at high pressure and high flow rates to a formation. For example, a GTE 20 may be connected to a respective pump 18 via a reduction transmission connected to a drive shaft, which, in turn, is connected to an input shaft or input flange of a respective reciprocating pump 18. Other types of GTE-to-pump arrangements are contemplated. In some examples, one or more of the GTEs 20 may be a dual-fuel or bi-fuel GTE, for example, capable of being operated using of two or more different types of fuel, such as natural gas and diesel fuel, although other types of fuel are contemplated. For example, a dual-fuel or bi-fuel GTE may be capable of being operated using a first type of fuel, a second type of fuel, and/or a combination of the first type of fuel and the second type of fuel. For example, the fuel may include compressed natural gas (CNG), natural gas, field gas, pipeline gas, methane, propane, butane, and/or liquid fuels, such as, for example, diesel fuel (e.g., #2 Diesel), bio-diesel fuel, bio-fuel, alcohol, gasoline, gasohol, aviation fuel, etc. Gaseous fuels may be supplied by CNG bulk vessels, a gas compressor, a liquid natural gas vaporizer, line gas, and/or well-gas produced natural gas. Other types and sources of fuel are contemplated. The one or more GTEs 20 may be operated to provide horsepower to drive via a transmission one or more of the pumps 18 to safely and successfully fracture a formation during a well stimulation project.

Although not shown in FIG. 1, the hydraulic fracturing system 16 may include a plurality of water tanks for supplying water for a fracking fluid, one or more chemical tanks for supplying gels or agents for adding to the fracking fluid, and a plurality of proppant tanks (e.g., sand tanks) for supplying proppants for the fracking fluid. The hydraulic fracturing system 16 may also include a hydration unit for mixing water from the water tanks and gels and/or agents from the chemical tank to form a mixture, for example, gelled water. The hydraulic fracturing system 16 may also include a blender, which receives the mixture from the hydration unit and proppants via conveyers from the proppant tanks. The blender may mix the mixture and the proppants into a slurry to serve as fracking fluid for the hydraulic fracturing system 16. Once combined, the slurry may be discharged through low-pressure hoses, which convey the slurry into two or more low-pressure lines in a frac manifold 24, as shown in FIG. 1. Low-pressure lines in the frac manifold 24 feed the slurry to the plurality of pumps 18 shown in FIG. 1 through low-pressure suction hoses.

FIG. 1 shows an example fuel delivery system 10 associated with a plurality, or fleet, of example hydraulic fracturing units 12 according to embodiments of the disclosure, identified as 12a, 12b, 12c, 12d, 12e, 12f, 12g, and 12h, although fewer or more hydraulic fracturing units 12 are contemplated. In the example shown, each of the plurality hydraulic fracturing units 12 includes a GTE 20, identified respectively as 20a, 20b, 20c, 20d, 20e, 20f, 20g, and 20h. Each of the GTEs 20 supplies power for each of the hydraulic fracturing units 12 to operate a pump 18, identified respectively as 18a, 18b, 18c, 18d, 18e, 18f, 18g, and 18h.

The pumps 18 are driven by the GTEs 20 of the respective hydraulic fracturing units 12 and discharge the slurry (e.g., the fracking fluid including the water, agents, gels, and/or proppants) at high pressure and/or a high flow rates through individual high-pressure discharge lines 26 into two or more high-pressure flow lines 28, sometimes referred to as "missiles," on the frac manifold 24. The flow from the flow lines 28 is combined at the frac manifold 24, and one or more of the flow lines 28 provide flow communication with a manifold assembly, sometimes referred to as a "goat head." The manifold assembly delivers the slurry into a wellhead manifold, sometimes referred to as a "zipper manifold" or a "frac manifold." The wellhead manifold may be configured to selectively divert the slurry to, for example, one or more well heads via operation of one or more valves. Once the fracturing process is ceased or completed, flow returning from the fractured formation discharges into a flowback manifold, and the returned flow may be collected in one or more flowback tanks.

In the example shown in FIG. 1, one or more of the components of the hydraulic fracturing system 16 may be configured to be portable, so that the hydraulic fracturing system 16 may be transported to a well site, assembled, operated for a relatively short period of time, at least partially disassembled, and transported to another location of another well site for use. In the example shown in FIG. 1, each of the pumps 18 and GTEs 20 of a respective hydraulic fracturing unit 12 may be connected to (e.g., mounted on) a chassis 30, identified respectively as 30a, 30b, 30c, 30d, 30e, 30f, 30g, and 30h. In some examples, the chassis 30 may include a trailer (e.g., a flat-bed trailer) and/or a truck body to which the components of a respective hydraulic fracturing unit 12 may be connected. For example, the components may be carried by trailers and/or incorporated into trucks, so that they may be easily transported between well sites.

As shown in FIG. 1, the example fuel delivery system 10 may include a plurality of fuel line connection assemblies 14, for example, for facilitating the supply of fuel from the fuel source 22 to each of the GTEs 20 of the hydraulic fracturing system 16. In some examples, for example, as shown in FIGS. 1, 2A, 2B, and 3, one or more of the fuel line connection assemblies 14 may include a manifold line 32 defining an inlet end 34, an outlet end 36, and a flow path 38 for fuel extending between the inlet end 36 and the outlet end 38. In addition, the fuel line connection assemblies 14 may include an inlet coupling 40 proximate the inlet end 34 and configured to be connected to a fuel line 42 providing flow communication with the fuel source 22, and an outlet coupling 44 proximate the outlet end 36 and configured to be connected to an inlet end of another manifold line or a blocking device configured to prevent flow from the outlet end 36 of the manifold line 32, for example, as explained in more detail herein.

For example, as shown in FIG. 1, the fuel delivery system 10 may include a fuel line connection assembly 14 associated with each of the hydraulic fracturing units 12a through 12h. In the example configuration shown in FIG. 1, a first hydraulic fracturing unit 12a may be in flow communication with the fuel source 22 via the fuel line 42 (e.g., via fuel line 42a). The inlet coupling 40 of the first hydraulic fracturing unit 12a may be coupled to the fuel line 42a. The outlet coupling 44 for the first hydraulic fracturing unit 12a may be coupled to an inlet coupling of a manifold line of a second hydraulic fracturing unit 12b. Similarly, the outlet coupling of the second hydraulic fracturing unit 12b may be coupled to the inlet coupling of a manifold line of a third hydraulic fracturing unit 12c. The outlet coupling of the manifold line of the third hydraulic fracturing unit 12c may be coupled to an inlet coupling of a manifold line of a fourth hydraulic fracturing unit 12d.

In the example shown, the first through fourth hydraulic fracturing units 12a through 12d may make up a first bank 46 of the hydraulic fracturing units 12, and fifth through eighth hydraulic fracturing units 12e through 12h may make up a second bank 48 of the hydraulic fracturing units 12. In some examples, for example, as shown in FIG. 1, a fifth hydraulic fracturing unit 12e may be in flow communication with the fuel source 22 via the fuel line 42 (e.g., via fuel line 42b). The inlet coupling of the fifth hydraulic fracturing unit 12e may be coupled to the fuel line 42. The outlet coupling for the fifth hydraulic fracturing unit 12e may be coupled to an inlet coupling of a manifold line of a sixth hydraulic fracturing unit 12f. Similarly, the outlet coupling of the sixth hydraulic fracturing unit 12f may be coupled to an inlet coupling of a manifold line of a seventh hydraulic fracturing unit 12g. The outlet coupling of the manifold line of the seventh hydraulic fracturing unit 12g may be coupled to an inlet coupling of a manifold line of an eighth hydraulic fracturing unit 12h. The example fuel delivery system 10 shown in FIG. 1 may sometimes be referred to as a "daisy-chain" arrangement.

In this example manner, the fuel source 22 may supply fuel to the GTEs 20 of the hydraulic fracturing units 12. In some examples, fuel that reaches the end of the first bank 46 of the hydraulic fracturing units 12 remote from the fuel source 22 (e.g., the fourth hydraulic fracturing unit 12d) and/or fuel that reaches the end of the second bank 48 of the hydraulic fracturing units 12 remote from the fuel source 22 (e.g., the eighth hydraulic fracturing unit 12h) may be combined and/or transferred between the first bank 46 and the second bank 48, for example, via a transfer line 50 configured to provide flow communication between the first bank 46 and the second bank 48. For example, unused fuel supplied to either of the first bank 46 or the second bank 48 of hydraulic fracturing units 12 may be passed to the other bank of the two banks.

In some examples, the inlet coupling 40 and/or the outlet coupling 44 may include a flange configured to be secured to another flange of another manifold line and/or a fuel line. For example, the manifold line 32 may be a four-inch schedule 40 steel pipe, and the inlet coupling 40 and/or the outlet coupling 44 may include a four-inch 300 class weld neck flange, although other manifold line types and sizes are contemplated, as well as other coupling types and sizes. In some examples, the inlet coupling 40 may include a quick connect coupling configured to connect the inlet end 34 of the manifold line 32 in a fluid-tight manner with a quick connect coupling (e.g., a complimentary coupling) of an outlet end of another manifold line. In some examples, the outlet coupling 44 may include quick connect coupling configured to connect the outlet end 36 of the manifold line 32 in a fluid-tight manner with a quick connect coupling of an inlet end of yet another manifold line and/or a quick connect coupling of a blocking device configured to prevent flow from the outlet end 36 of the manifold line 32, for example, to effectively prevent flow through the manifold line 32 to another hydraulic fracturing unit 12 of a common hydraulic fracturing system 16. In some examples, the quick connect coupling may include a quarter-turn quick connect (e.g., a twister locking quick connect) or a safety quick coupler (e.g., transfer-loading safety quick coupling), for example, as disclosed herein with respect to FIGS. 17A, 17B, and 17C.

In addition, as shown in FIGS. 1, 2A, 2B, and 3, the fuel line connection assemblies 14 may include a distribution line 52 connected to the manifold line 32 and configured to provide flow communication between the manifold line 32 and a GTE 20 of the respective hydraulic fracturing unit 12. In some examples, the fuel line connection assembly 14 may also include a valve 54 in the manifold line 32 or the distribution line 52 and configured to change between an open condition through which fluid flows and a closed condition preventing fluid flow. In some examples, the valve 54 may be configured to facilitate flow communication or prevent flow communication between the fuel source 22 and the GTE 20. For example, the valve 54 may be configured to change to the closed condition to prevent flow of fuel to the corresponding GTE 20, for example, to cease operation of the GTE 20 and/or during testing related to portions of the fuel delivery system 20.

As shown in FIGS. 1, 2A, 2B, and 3, some examples of the fuel line connection assembly 14 may also include a sensor 56 disposed in the manifold line 32 (e.g., upstream relative to the distribution line 52) or the distribution line 52 and configured to generate a signal indicative of pressure associated with flow of fuel to the GTE 20 of the respective hydraulic fracturing unit 12. The sensor 56 may include any transducer configured to generate a signal indicative of pressure in the manifold line 32 and/or the distribution line 52. As shown in FIG. 1, some examples of the fuel line connection assembly 14 may include a pressure gauge 58 in flow communication with the manifold line 32 downstream of the distribution line 52, for example, configured to provide an indication of the pressure in the manifold line 32, for example, for an operator of the hydraulic fracturing system 16. The pressure gauge 58 may be any type of gauge configured to generate an indication of the pressure in the manifold line 32 downstream of the distribution line 52. In some examples, the indication of pressure may be viewed at a location remote from the manifold line 32, for example, at an operations console associated with the hydraulic fracturing operation.

Figure 2:
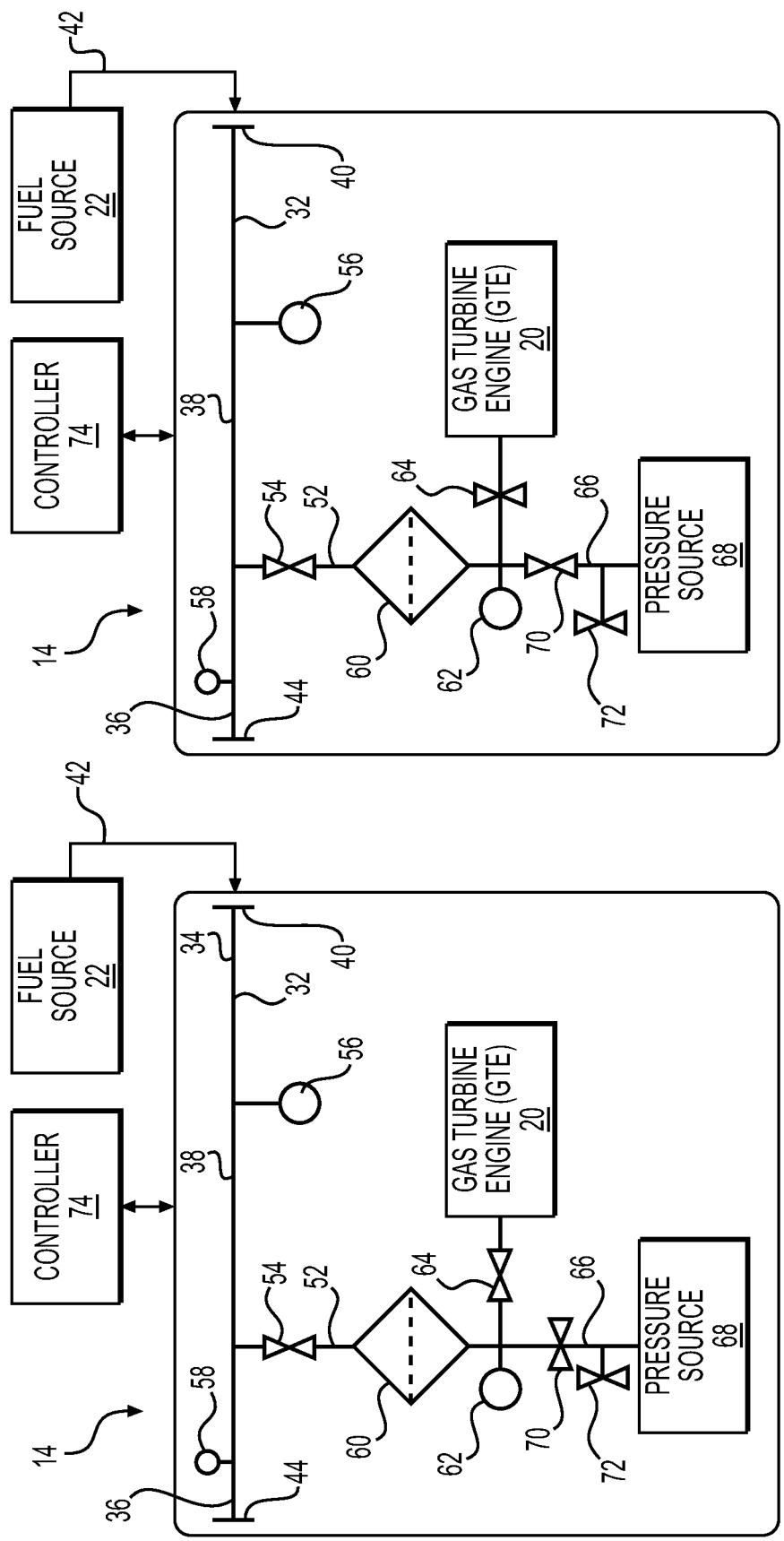
FIG. 2A is a schematic view of an example fuel line connection assembly in an example first condition for operation of a gas turbine engine according to embodiments of the disclosure.
FIG. 2B is a schematic view of the example fuel line connection assembly shown in FIG. 2A in an example second condition during an example pressure testing procedure.
Figure 3:
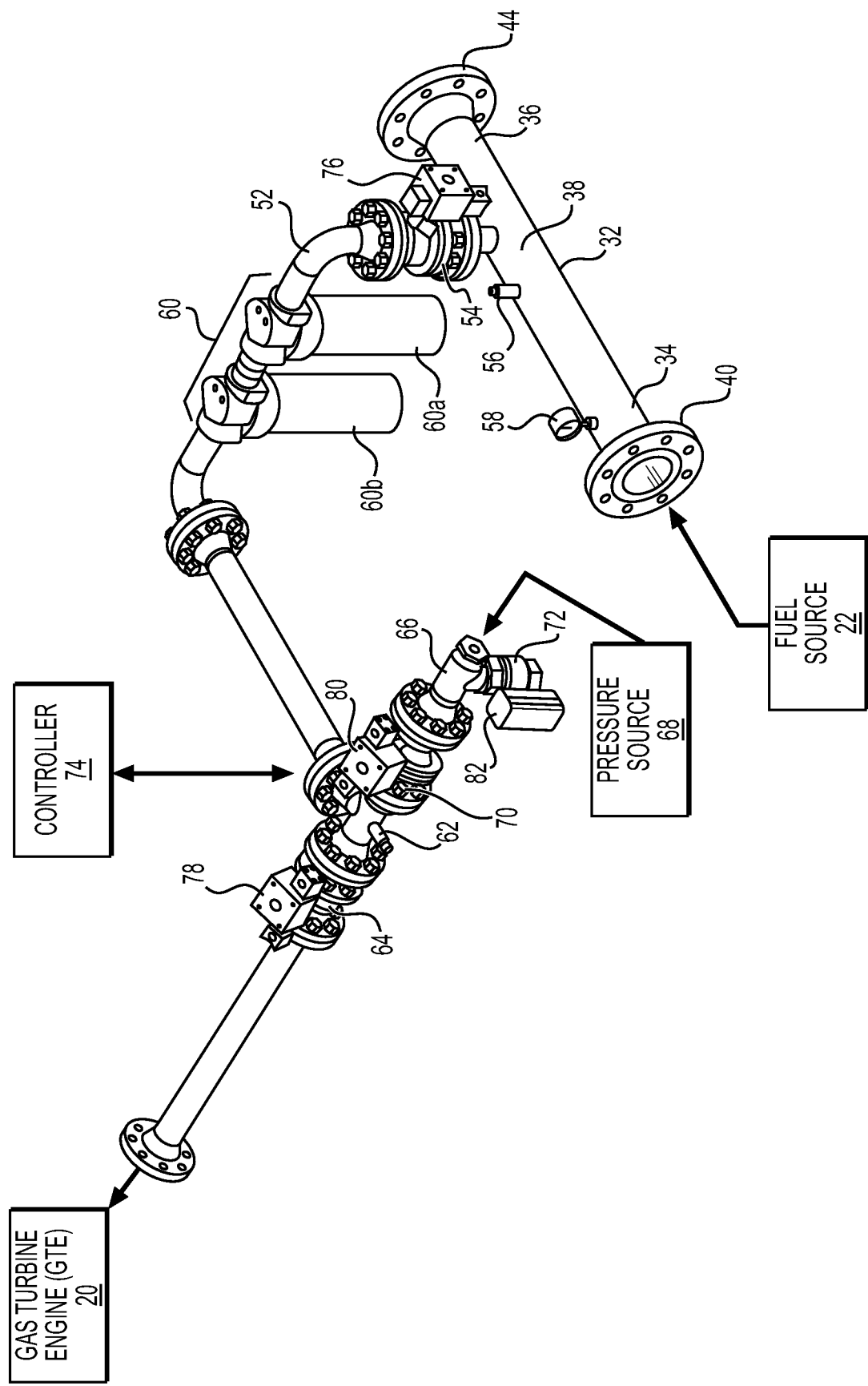
FIG. 3 is a perspective view of an example fuel line connection assembly according to embodiments of the disclosure.

As shown in FIGS. 1, 2A, and 2B, the fuel line connection assembly 14 may also include a filter 60 disposed in the distribution line 52 between the manifold line 32 and the GTE 20 and configured to filter one or more of particulates or liquids from fuel in flow communication with the GTE 20. For example, as shown in FIG. 3, the filter 60 may include a first filter 60a configured to remove particulates from fuel supplied to the GTE 20 and a second filter 60b (e.g., a coalescing filter) configured to remove liquids from the fuel line connection assembly 14 before fuel reaches the GTE 20. This may improve performance of the GTE 20 and/or reduce maintenance and/or damage to the GTE 20 due to contaminants in the fuel.

As shown in FIG. 1, some examples of the fuel line connection assembly 14 may also include a sensor 62 disposed in the distribution line 52 between the filter 60 and the GTE 20 of the respective hydraulic fracturing unit 12. The sensor 62 may be configured to generate a signal indicative of pressure associated with flow of fuel between the filter 60 and the GTE 20. The sensor 56 and/or the sensor 62, upstream and downstream, respectively, of the filter 60, may be used to determine a pressure differential across the filter 60, which, if higher than a predetermined pressure, may be an indication that the filter 60 is inhibiting fuel flow through the filter 60, which may be an indication that the filter 60 should be cleaned, serviced, and/or replaced.

In some examples, the fuel line connection assembly 14 may be configured to facilitate testing for leaks in at least a portion of the fuel delivery system 10 according to some embodiments of the disclosure. For example, as shown in FIGS. 1, 2A, 2B, and 3, the fuel line connection assembly 14 may be configured to perform a pressure test to identify leaks in at least a portion of the fuel delivery system 10. For example, the valve 54 may be a first valve 54, and the fuel line connection assembly 14 may further include a second valve 64 disposed in the distribution line 52 and configured to change between an open condition through which fluid flows and a closed condition preventing fluid flow. The second valve 64 may be configured facilitate flow communication or prevent flow communication between the filter 60 and the GTE 20 of the respective hydraulic fracturing unit 12. The fuel line connection assembly 14 may also include a test line 66 in flow communication with the distribution line 52 between the filter 60 and the GTE 20 and configured to provide flow communication between a pressure source 68 and the filter 60. In some examples, the fuel line connection assembly 14 may also include a third valve 70 disposed in the test line 66 and configured to change between an open condition through which fluid flows and a closed condition preventing fluid flow. The third valve 70 may be configured to facilitate flow communication or prevent flow communication between the pressure source 68 and the filter 60. In some examples, the fuel line connection assembly 14 may further include a fourth valve 72 disposed between the pressure source 68 and the filter 60 and configured to change between an open condition through which fluid flows and a closed condition preventing fluid flow. The fourth valve 72 may be configured to release pressure in the test line 66 between the pressure source 68 and the third valve 70, for example as disclosed herein. One or more of the first valve 54, the second valve 64, the third valve 70, or the fourth valve 72 may be a ball valve, although other types of valves are contemplated.

As shown in FIGS. 1, 2A, 2B, and 3, the fuel line connection assembly 14 may also include a controller 74 configured to facilitate pressure testing at least a portion of the fuel delivery system 10 and in communication with one or more of the sensors 56 and 62 configured to generate signals indicative of pressure, one or more of the first valve 54, the second valve 64, the third valve 70, or the fourth valve 72, and the pressure source 68. In some examples, the controller 74 may be configured to cause operation of one or more of the first valve 54, the second valve 64, the third valve 70, or the fourth valve 72, and receive one or more signals from one or more of the sensors 56 and 62. Based at least in part on the one or more signals, the controller 74 may be configured to determine the presence of a leak in at least a portion of the fuel delivery system 14 and/or the fuel line connection assembly 14, for example, semi- or fully-autonomously.

For example, as shown in FIG. 3, the fuel line connection assembly 14 may include one or more actuators connected respectively to one or more of the first valve 54, the second valve 64, the third valve 70, or the fourth valve 72 and configured cause one or more of the first valve 54, the second valve 64, the third valve 70, or the fourth valve 72 to change conditions, for example, between an open condition and a closed condition. As shown, a first actuator 76, a second actuator 78, a third actuator 80, and a fourth actuator 82 are respectively connected to the first valve 54, the second valve 64, the third valve 70, and the fourth valve 72, and are configured to control the condition of the respective valve. As explained below, by coordinated activation of the first actuator 76, second actuator 78, third actuator 80, and/or fourth actuator 82, and in some examples, control of the pressure source 68, the controller 74 may be configured to pressure test at least a portion of the fuel delivery system 14 and/or one or more of the fuel line connection assemblies 14 of the fuel delivery system 10, for example, to identify leaks in at least a portion of the fuel delivery system 14, including one or more of the fuel line connection assemblies 14 of the fuel delivery system 10.

For example, FIG. 2A is a schematic view of an example fuel line connection assembly 14 in an example first condition for operation of the GTE 20 according to embodiments of the disclosure. As shown in FIG. 2A, the first valve 54 and the second valve 64 are in the open condition, such that fuel from the fuel source 22 flows via the fuel line 42, into the inlet end 34 of the manifold line 32 of the fuel line connection assembly 14, into the distribution line 52, through the first valve 54, through the filter 60, and through the second valve 64 to the GTE 20 for combustion to drive the pump 18 connected to the GTE 20. As shown in FIG. 2A, the third valve 70 and the fourth valve 72 are in the closed condition preventing fuel flow through those valves and/or preventing pressure from the pressure source 68 from entering the fuel line connection assembly 14 through the third valve 70. In some examples, the controller 74 may be configured to communicate with the first actuator 76, second actuator 78, third actuator 80, and/or fourth actuator 82 (see FIG. 3) to cause the respective valves to have the above-noted conditions (e.g., open or closed).

FIG. 2B is a schematic view of the example fuel line connection assembly 14 shown in FIG. 2A in an example second condition during a portion of an example pressure testing procedure. As shown in FIG. 2B, to perform a pressure test according to some embodiments of the disclosure, the controller 74 may be configured to cause the first valve 54 to be in the open condition, cause the second valve 64 to be in the closed condition, cause the third valve 70 to be in the open condition, and cause the pressure source 68 to increase pressure in one or more of the distribution line 52 or the manifold line 32. The controller 74 may be further configured to determine the presence of a leak in the fuel line connection assembly 14 based at least in part on signals indicative of pressure received from the sensor 62 between the pressure source 68 and the filter 60 and/or the sensor 56 between the filter 60 and the fuel source 22. For example, as explained in more detail herein with respect to FIG. 8, the controller 74 may be configured to cause (or allow) the pressure source 68 to cause an increase in pressure (or at least attempt to cause an increase in pressure) in the fuel line connection assembly 14 and/or at least portions of the fuel delivery system 10. Depending at least in part on whether a threshold pressure in the fuel line connection system 14 and/or the fuel delivery system 10 can be achieved, how quickly the threshold pressure is achieved, and/or once the threshold pressure is achieved, how long and/or how much of the threshold pressure is maintained, the controller 74 may be configured to determine whether a leak in the fuel line connection assembly 14 and/or the fuel delivery system 10 exists, and generate a signal indicative of the leak. In some examples, increasing pressure via the pressure source 68 in at least a portion of the fuel delivery system 10 and/or fuel line connection assembly 14 may include activating a compressor in flow communication with at least a portion of the fuel delivery system 10 and/or fuel line connection assembly 14 through the third valve 70 and/or opening a valve of a pressurized cylinder in flow communication with at least a portion of the fuel delivery system 10 and/or the fuel line connection assembly 14 through the third valve 70. In some examples, the pressure source 68 may include a cascade gas system, and in some examples, the pressurized gas may include nitrogen, argon, neon, helium, krypton, xenon, radon, and/or carbon dioxide, although other gases are contemplated. In some examples, the controller 74 may include one or more industrial control systems (ICS), such as, for example, supervisory control and data acquisition (SCADA) systems, distributed control systems (DCS), micro controllers, and/or programmable logic controllers (PLCs).

In some examples, once the testing is complete, or in order to cease the testing, the controller 74 may be configured to cause the third valve 70 to change from the open condition to the closed condition, for example, via activation of the third actuator 80, and cause the fourth valve 72 to change from the closed condition to the open condition, for example, via activation of the fourth actuator 82, to thereby close-off the pressure source 68 and/or bleed any remaining excess pressure between the pressure source 68 and the third valve 70. The controller 74 may also cause the second valve 64 to return to the open condition, for example, via activation of the second actuator 78, and/or ensure that the first valve 54 remains in the open condition (see FIG. 2A), thereby causing the fuel delivery system 10 and/or the fuel line connection assembly 14 to be in a condition to supply fuel from the fuel source 22 for operation of the GTE 20.

Figure 4:
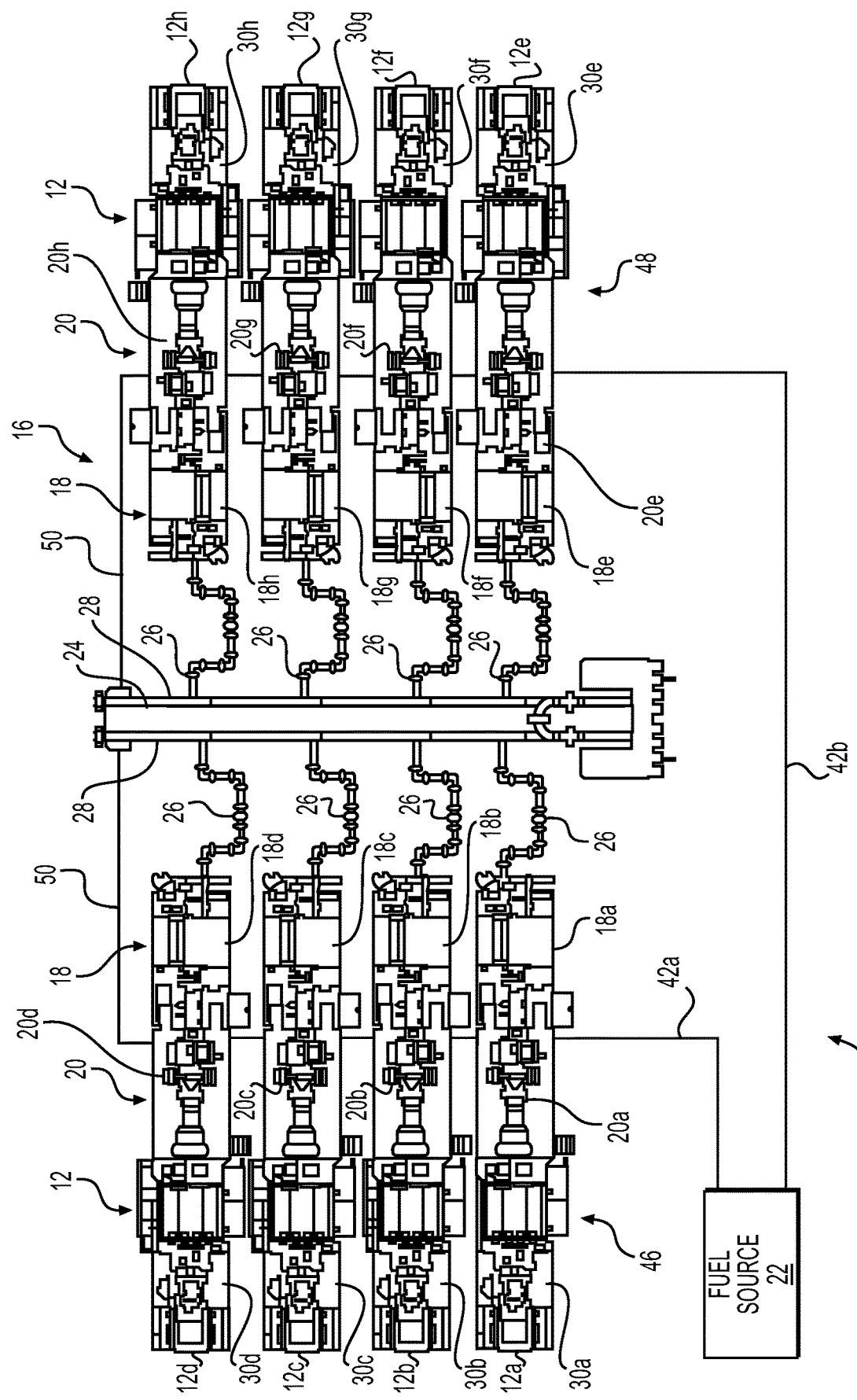
FIG. 4 is a schematic diagram showing an example fuel delivery system for supplying fuel to a plurality of hydraulic fracturing units according to embodiments of the disclosure.

FIG. 4 is a schematic diagram showing an example fuel delivery system 10 for supplying fuel to a plurality of hydraulic fracturing units 12 according to embodiments of the disclosure. As shown in FIG. 4, a first hydraulic fracturing unit 12a may be in flow communication with the fuel source 22 via the fuel line 42 (e.g., via a first fuel line 42a). The inlet coupling 40 of the first hydraulic fracturing unit 12a may be coupled to the fuel line 42a. The outlet coupling 44 for the first hydraulic fracturing unit 12a may be coupled to an inlet coupling of a manifold line of a second hydraulic fracturing unit 12b. Similarly, the outlet coupling of the second hydraulic fracturing unit 12b may be coupled to the inlet coupling of a manifold line of a third hydraulic fracturing unit 12c. The outlet coupling of the manifold line of the third hydraulic fracturing unit 12c may be coupled to an inlet coupling of a manifold line of a fourth hydraulic fracturing unit 12d.

In the example shown, the first through fourth hydraulic fracturing units 12a through 12d may make up a first bank 46 of the hydraulic fracturing units 12, and fifth through eighth hydraulic fracturing units 12e through 12h may make up a second bank 48 of the hydraulic fracturing units 12. In some examples, for example as shown in FIG. 1, a fifth hydraulic fracturing unit 12e may be in flow communication with the fuel source 22 via the fuel line 42 (e.g., via a second fuel line 42b). The inlet coupling of the fifth hydraulic fracturing unit 12e may be coupled to the fuel line 42b. The outlet coupling for the fifth hydraulic fracturing unit 12e may be coupled to an inlet coupling of a manifold line of a sixth hydraulic fracturing unit 12f. Similarly, the outlet coupling of the sixth hydraulic fracturing unit 12f may be coupled to an inlet coupling of a manifold line of a seventh hydraulic fracturing unit 12g. The outlet coupling of the manifold line of the seventh hydraulic fracturing unit 12g may be coupled to an inlet coupling of a manifold line of an eighth hydraulic fracturing unit 12h. The example fuel delivery system 10 shown in FIG. 4 may sometimes be referred to as a "daisy-chain" arrangement.

Figure 5:
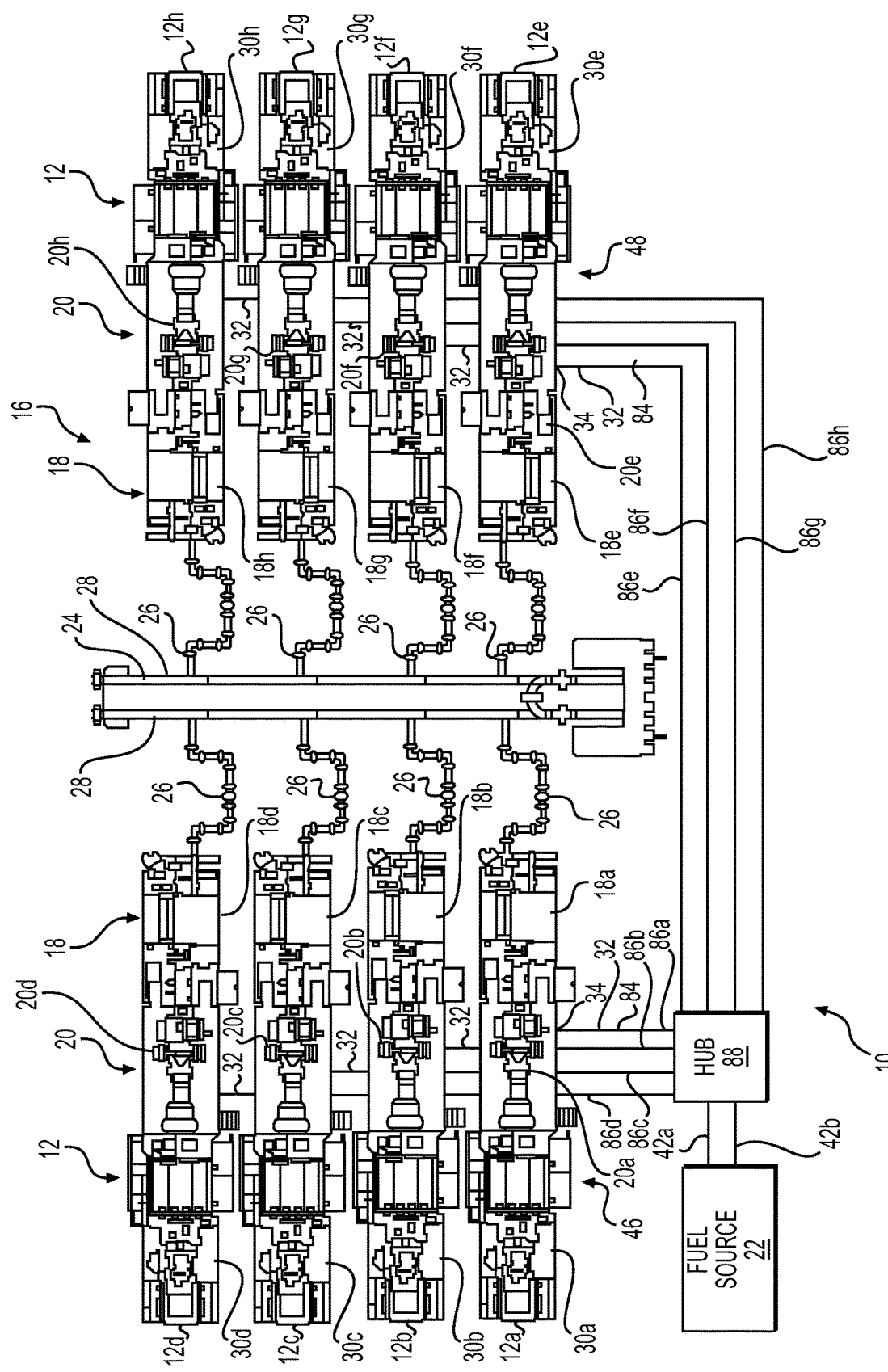
FIG. 5 is a schematic diagram showing another example fuel delivery system for supplying fuel to a plurality of hydraulic fracturing units according to embodiments of the disclosure.

FIG. 5 is a schematic diagram showing another example fuel delivery system 10 for supplying fuel to a plurality of hydraulic fracturing units 12 according to embodiments of the disclosure. As shown in FIG. 5, the inlet end 34 of the manifold line 32 of the first hydraulic fracturing unit 12a is connected to an outlet 84 of a main fuel line 86a, which is connected to a hub 88 (e.g., a fuel hub). Rather than being connected to an inlet end of another manifold line of the second hydraulic fracturing unit 12b as in FIG. 4, the outlet end 36 of the manifold line 32 of the first hydraulic fracturing unit 12a is connected to a blocking device (not shown) configured to prevent flow from the outlet end 36 of the manifold line 32 of the first hydraulic fracturing unit 12a. The inlet ends of the respective manifold lines of the second hydraulic fracturing unit 12b, the third hydraulic fracturing unit 12c, the fourth hydraulic fracturing unit 12d, the fifth hydraulic fracturing unit 12e, the sixth hydraulic fracturing unit 12f, the seventh hydraulic fracturing unit 12g, and the eighth hydraulic fracturing unit 12h (and/or more hydraulic fracturing units) are connected to the hub 88 via respective main fuel lines 86b, 86c, 86d, 86e, 86f, 86g, and 86h. The outlet ends of the manifold lines of the second through eighth hydraulic fracturing units 12b through 12h are each connected to a blocking device (not shown) configured to prevent flow from the outlet ends of the respective manifold lines. The example fuel delivery system 10 shown in FIG. 5 may sometimes be referred to as a "hub and spoke" arrangement.

Figure 6:
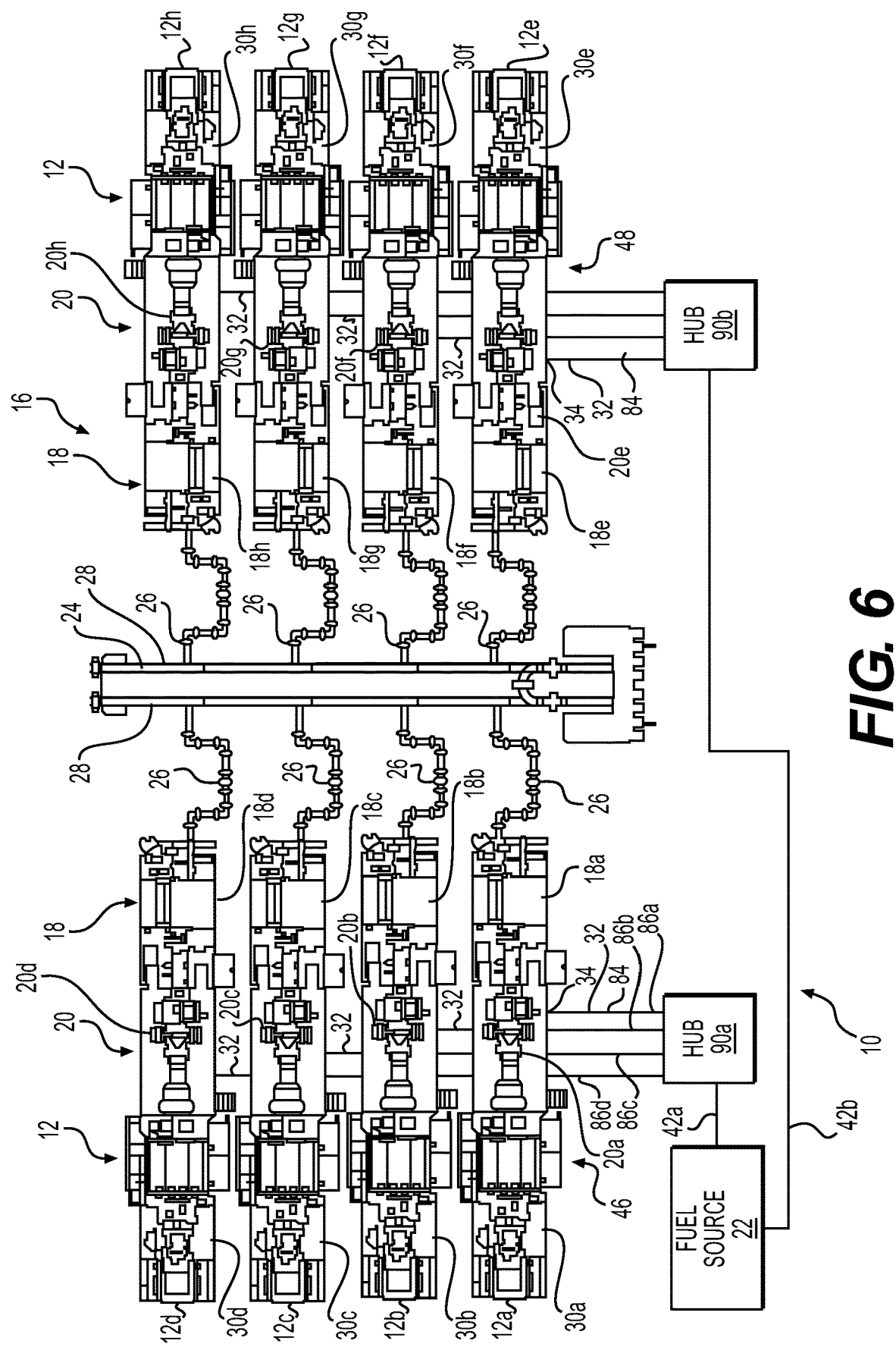
FIG. 6 is a schematic diagram showing a further example fuel delivery system for supplying fuel to a plurality of hydraulic fracturing units according to embodiments of the disclosure.

FIG. 6 is a schematic diagram showing a further example fuel delivery system 10 for supplying fuel to a plurality of hydraulic fracturing units 12 according to embodiments of the disclosure. The example fuel delivery system shown in FIG. 6 is similar to the example fuel delivery system shown in FIG. 5, except that the fuel delivery system 10 includes two hubs 90a and 90b (e.g., fuel hubs). A first one of the hubs 90a is connected to the fuel source 22 via a first fuel line 42, and a second hub 90b is connected to the fuel source 22 via a second fuel line 42b. The first hub 90a may supply fuel to one or more (e.g., each) of the GTEs 20 of the first bank 46 of hydraulic fracturing units 12, and the second hub 90b may supply fuel to one or more (e.g., each) of the GTEs 20 of the second bank 48 of hydraulic fracturing units 12. More than two hubs are contemplated. The example fuel delivery system 10 shown in FIG. 5 may sometimes be referred to as a "hub and spoke" arrangement, with two or more hubs.

Figure 7:
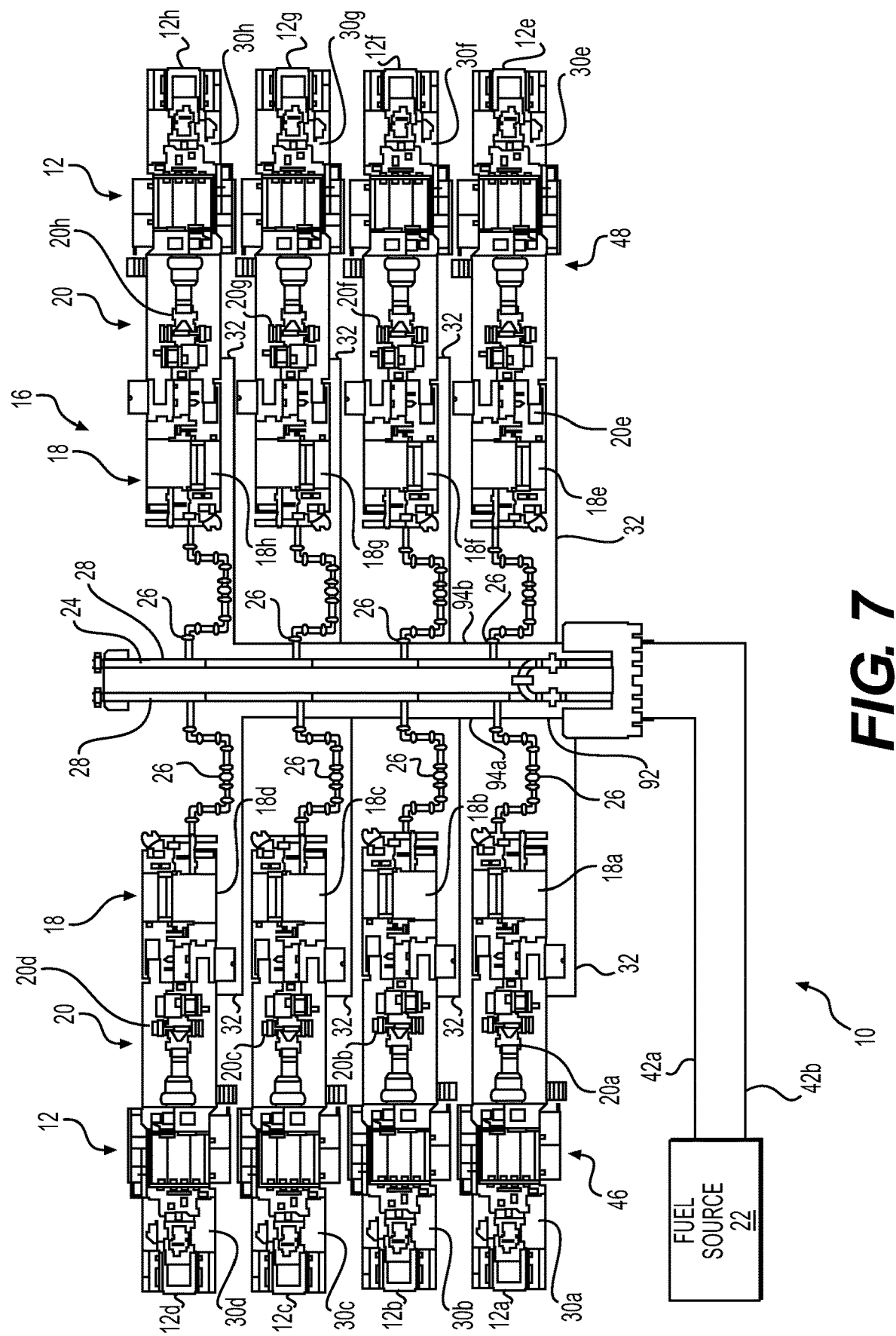
FIG. 7 is a schematic diagram showing another example fuel delivery system for supplying fuel to a plurality of hydraulic fracturing units according to embodiments of the disclosure.

FIG. 7 is a schematic diagram showing another example fuel delivery system 10 for supplying fuel to a plurality of hydraulic fracturing units 12 according to embodiments of the disclosure. The example fuel delivery system 10 shown in FIG. 7 includes a fuel manifold 92, and the example fuel manifold 92 receives fuel from the fuel source 22 via a first fuel line 42a and a second fuel line 42b, with the first fuel line 42a supplying fuel to the GTEs 20 of the first bank 46 of hydraulic fracturing units 12, and the second fuel line 42b supplying fuel for the GTEs 20 of the second bank 48 of hydraulic fracturing units 12. In some examples, the inlet end 34 of the manifold line 32 of the first hydraulic fracturing unit 12a is connected to a respective outlet of the fuel manifold 92 (e.g., a first bank 94a of the fuel manifold 92 the or main fuel line). In the example shown, the outlet end 36 of the manifold line 32 of the first hydraulic fracturing unit 12a is connected to a blocking device (not shown) configured to prevent flow from the outlet end 36 of the manifold line 32 of the first hydraulic fracturing unit 12a. The inlet ends of the respective manifold lines of the second hydraulic fracturing unit 12b, the third hydraulic fracturing unit 12c, and the fourth hydraulic fracturing unit 12d are connected to the first bank 94a of the fuel manifold 92. The outlet ends of the manifold lines of the second through fourth hydraulic fracturing units 12b through 12d are each connected to a blocking device (not shown) configured to prevent flow from the outlet ends of the respective manifold lines. In the example shown in FIG. 7, the inlet ends of the respective manifold lines of the fifth hydraulic fracturing unit 12e through the eighth hydraulic fracturing unit 12h are connected to respective outlets of the fuel manifold 92 (e.g., a second bank 94b of the fuel manifold 92 or main fuel line). In the example shown, the outlet ends of the respective manifold lines of the fifth through eighth hydraulic fracturing units 12e through 12h are each connected to a blocking device (not shown) configured to prevent flow from the outlet ends of the respective manifold lines of the fifth through eighth hydraulic fracturing units 12e through 12h. In some examples, the fuel manifold 92 may be connected to a trailer for portability. The example fuel delivery system 10 shown in FIG. 7 may sometimes be referred to as a "combination" arrangement.

In some examples, the configuration of the fuel line connection assemblies 14 may facilitate arranging the hydraulic fracturing units in (1) a "daisy-chain" arrangement, in which fuel passes through each of manifold lines 32 in a series-type arrangement, (2) a "hub and spoke" arrangement, in which an inlet end of each of the manifold lines 32 is connected to a fuel line from a fuel hub or the fuel source and flow from an outlet end is prevented, or (3) a "combination" arrangement, such as the example shown in FIG. 7, which may include connection of the inlet ends of the manifold lines 32 to a fuel manifold 92. Different arrangements may be desirable depending on a number of factors associated with the fracturing operation, and the flexibility of arrangements provided by at least some examples of the fuel delivery system 10 may reduce the need for multiple sets of parts to achieve each of the different arrangements. In addition, the couplings provided by the manifold lines 32, at least according to some embodiments, may reduce the time and complexity associated with setting-up and/or breaking-down the hydraulic fracturing system 16. In some examples, the number and/or types of tools required to set-up and/or break-down the hydraulic fracturing system 16 may also be reduced.

Figure 8:
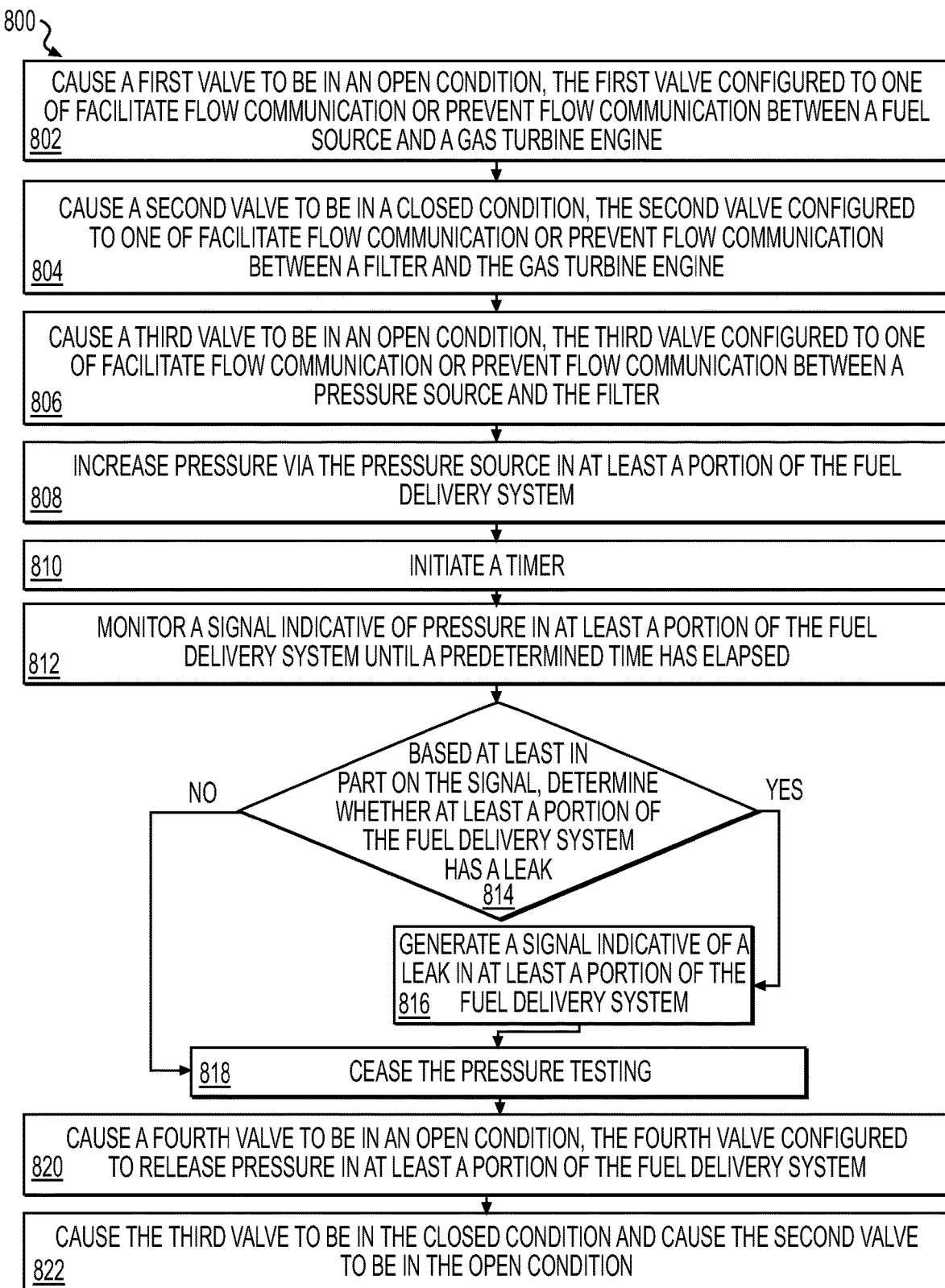
FIG. 8 is a block diagram of an example method for pressure testing at least a portion of an example fuel delivery system for supplying fuel from a fuel source to a plurality of gas turbine engines according to embodiments of the disclosure.

FIG. 8 is a block diagram of an example method 800 for pressure testing at least a portion of a fuel delivery system for supplying fuel from a fuel source to a plurality of GTEs according to embodiments of the disclosure, illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIG. 8 is a flow diagram of an example method 800 for pressure testing at least a portion of a fuel delivery system for supplying fuel from a fuel source to a plurality of GTEs, for example, associated with pumps in a hydraulic fracturing system, according to embodiments of the disclosure. In some examples, the method 800 may be performed semi- or fully-autonomously, for example, via a controller. The method 800 may be utilized in association with various systems, such as, for example, the example fuel delivery systems 10 shown in one or more of FIG. 1, 2A, 2B, 3-7, or 9-16.

The example method 800, at 802, may include causing a first valve to be in an open condition. The first valve may be configured to facilitate flow communication or prevent flow communication between a fuel source and a GTE of the plurality of GTEs. For example, a controller may be configured to communicate with an actuator to activate the actuator to cause the first valve to be in the open condition, so that flow communication exists between the GTE and the fuel source.

At 804, the example method 800 may further include causing a second valve to be in a closed condition. The second valve may be configured to facilitate flow communication or prevent flow communication between a filter configured to filter one or more of particulates or liquids from fuel and the GTE. For example, the controller may be configured to communicate with an actuator to activate the actuator to cause the second valve to be in the closed condition, so that flow communication between the filter and the GTE is prevented. This may effectively isolate or close-off the GTE from flow communication with the fuel delivery system and/or the remainder fuel line connection assembly (e.g., with the distribution line).

At 806, the example method 800 may also include causing a third valve to be in an open condition. The third valve may be configured to facilitate flow communication or prevent flow communication between a pressure source and the filter. For example, the controller may be configured to communicate with an actuator to activate the actuator to cause the third valve to be in the open condition, so that flow communication exists between the pressure source and the filter.

The example method 800, at 808, may further include increasing pressure via the pressure source in the at least a portion of the fuel delivery system. For example, the controller may be configured to cause the pressure source to increase pressure (or at least attempt to increase pressure) in the fuel line connection assembly and/or the fuel delivery system, for example, to determine whether the fuel line connection assembly and/or the fuel line delivery system is sufficiently leak-tight for pressure to increase to, and/or hold, a predetermined or threshold pressure for a period of time. In some examples, increasing pressure via the pressure source may include activating a compressor in flow communication with the portion of the fuel line connection assembly and/or the fuel delivery system, and/or opening a valve of a pressurized cylinder in flow communication with the portion of the fuel line connection assembly and/or the fuel delivery system.

The example method 800, at 810, may also include initiating a timer. In some examples, the controller may be configured to initiate a timer and cause the increase (or attempt to increase) the pressure until a predetermined time has elapsed.

At 812, the example method 800 may also include monitoring a signal indicative of pressure in the at least a portion of the fuel delivery system. For example, a pressure sensor in flow communication with the fuel line connection system and/or the fuel delivery system may generate one or more signals indicative of the pressure in the assembly and/or system, for example, and the controller may receive the one or more signals and determine whether the pressure increases to the predetermined or threshold pressure.

At 814, the example method 800 may further include, based at least in part on the signal, determining whether the at least a portion of the fuel delivery system has a leak. For example, the controller may receive the one or more signals from the sensor indicative of pressure in the fuel line connection assembly and/or the fuel delivery system and, based at least in part on the one or more signals, determine whether a leak exists in the fuel line connection assembly and/or the fuel delivery system. In some examples, this determination may include comparing the pressure in at least a portion of the fuel delivery system at the end of the predetermined time to a predetermined pressure, and determining whether the portion of the fuel delivery system has a leak when the pressure in the portion of the fuel delivery system is less than the predetermined pressure, or the portion of the fuel delivery system does not have a leak when the pressure in the at least a portion of the fuel delivery system is at least the predetermined pressure by the end of the predetermined time. In some examples, if it has been determined that the pressure in the fuel delivery system has reached the predetermined pressure, for example, prior to the end of the predetermined time, the method may include initiating the timer, waiting for a second predetermined time to elapse, and comparing the pressure in the portion of the fuel delivery system at the second predetermined time to the predetermined pressure. If the pressure in the fuel delivery system remains above the predetermined pressure at the end of the second predetermined time, the controller may be configured to determine that the fuel line connection assembly and/or the fuel delivery system does not have a leak.

The example method 800, at 816, if it has been determined that the fuel delivery system has a leak, may also include generating a signal indicative of the leak. For example, if the controller determines that the fuel line connection assembly and/or the fuel delivery system has a leak, the controller may generate an alarm signal indicative of the leak that may be received by personnel at the hydraulic fracturing site, so that remedial measures may be performed. In some examples, the method may be configured to sequentially isolate fuel line connection assemblies associated with respective hydraulic fracturing units and perform a pressure test on each one of the fuel line connection assemblies associated with each of the hydraulic fracturing units. For example, the controller may be configured to cause valves of fuel line connection assemblies to be in a closed condition, so that a fuel line connection assembly being tested can be isolated and the pressure test performed for the isolated fuel line connection assembly. This process may be repeated for one or more of the other fuel line connection assemblies associated with respective hydraulic fracturing units.

The example method 800, at 818, if no leak has been determined at 814, may further include ceasing the pressure testing, for example, after one or more of the predetermined times have elapsed and no leaks have been detected by the controller. In addition, once a leak has been detected, for example, at 814, the method 800 may also include ceasing the pressure testing. This may include isolating the pressure source from the fuel line connection assembly and/or the fuel delivery system. In some examples, this may include ceasing operation of a compressor, closing a valve on a pressure source, such as a high pressure tank, etc.

At 820, the example method 800 may include causing a fourth valve to be in an open condition. The fourth valve may be configured to release pressure in the at least a portion of the fuel delivery system, such as the fuel line connection assembly and/or the test line. The controller may communicate with an actuator associated with the fourth valve to cause the fourth valve to be in the open condition, thereby releasing pressure increased during the pressure testing from the fuel line connection assembly and/or the fuel delivery system.

At 822, the example method 800 may further include causing the third valve to be in the closed condition and causing the second valve to be in the open condition. For example, the controller may be configured to communicate with actuators associated with the second and third valves and cause the second valve to be in the open condition so that fuel from the fuel source may be supplied to the GTE and cause the third valve to be in the closed condition to prevent fuel from passing to the test line and/or the pressure source during operation of the GTE.

In some examples, once a pressure test has been initiated, the first valve will be caused to be in the open condition for example, to allow pressure from the pressure source to fill at least a portion of the fuel delivery system (e.g., the entire fuel delivery system, including one or more fuel lines from the fuel source). The second valve will be caused to be in the closed condition and isolate the GTE from the fuel delivery system. The third valve will be caused to be in the open condition to allow pressure from the pressure source the fill the fuel delivery system and build pressure therein. The fourth valve will be caused to be in the closed condition to allow pressure to build (or attempt to build) in the fuel delivery system.

Once the first, second, third, and fourth valves are in the above-noted conditions, the pressure source will be activated to build (or attempt to build) pressure in the fuel delivery system. The sensors will generate signals indicative of the pressure in the fuel delivery system, which will be received by the controller. The controller will initiate a timer, and the pressure source will attempt to increase the pressure in the fuel delivery system to a predetermined threshold pressure for a predetermined time. The threshold pressure and/or the predetermined time may be set by an operator and/or automatically controlled via the controller according to a program. If the pressure source is unable to cause the pressure in the fuel delivery system to achieve the pressure threshold before the predetermined time has elapsed, the controller may cause the pressure source to discontinue attempting to increase the pressure in the fuel delivery system (e.g., the controller will cease operation of a compressor serving as the pressure source). The controller may also generate a signal and/or an alarm to notify an operator of a possible leak in the fuel delivery system.

If, however, the pressure in the fuel delivery system reaches the predetermine threshold pressure, the controller may cause the pressure source to discontinue attempting to increase the pressure in the fuel delivery system. The controller may also initiate a new timer and monitor the pressure in the fuel delivery system for a second predetermined time (e.g., five minutes). If the pressure in the fuel delivery system remains stable for the duration of the second predetermined time, the controller may determine that no leaks are present in the fuel delivery system, and the pressure test may be deemed successful. If the pressure drops, for example, greater than a predetermined rate (e.g., greater than 5% during the second predetermined time), the controller may be configured to generate a signal and/or an alarm to notify an operator of a possible leak in the fuel delivery system.

At the end of the pressure test, the controller (and/or the operator) may bleed pressure from the fuel delivery system, causing the fourth valve to change to the open condition to vent the pressure from the fuel delivery system. After pressure has been bled from the fuel delivery system, the controller may cause the first, second, third, and fourth valves to change to the condition consistent with operation of the hydraulic fracturing system, for example, such that the first valve is in the open condition to allow fuel to flow from the pressure source to the filter, the second valve is in the open condition to allow fuel to flow from the filter to the GTE, such that the third valve is in the closed condition to prevent fuel from flowing to the pressure source or to the fourth valve, and such that the fourth valve is in the closed condition, so that if another pressure test is commenced, the fourth valve will prevent bleeding of the pressure from the pressure source.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Figure 9:
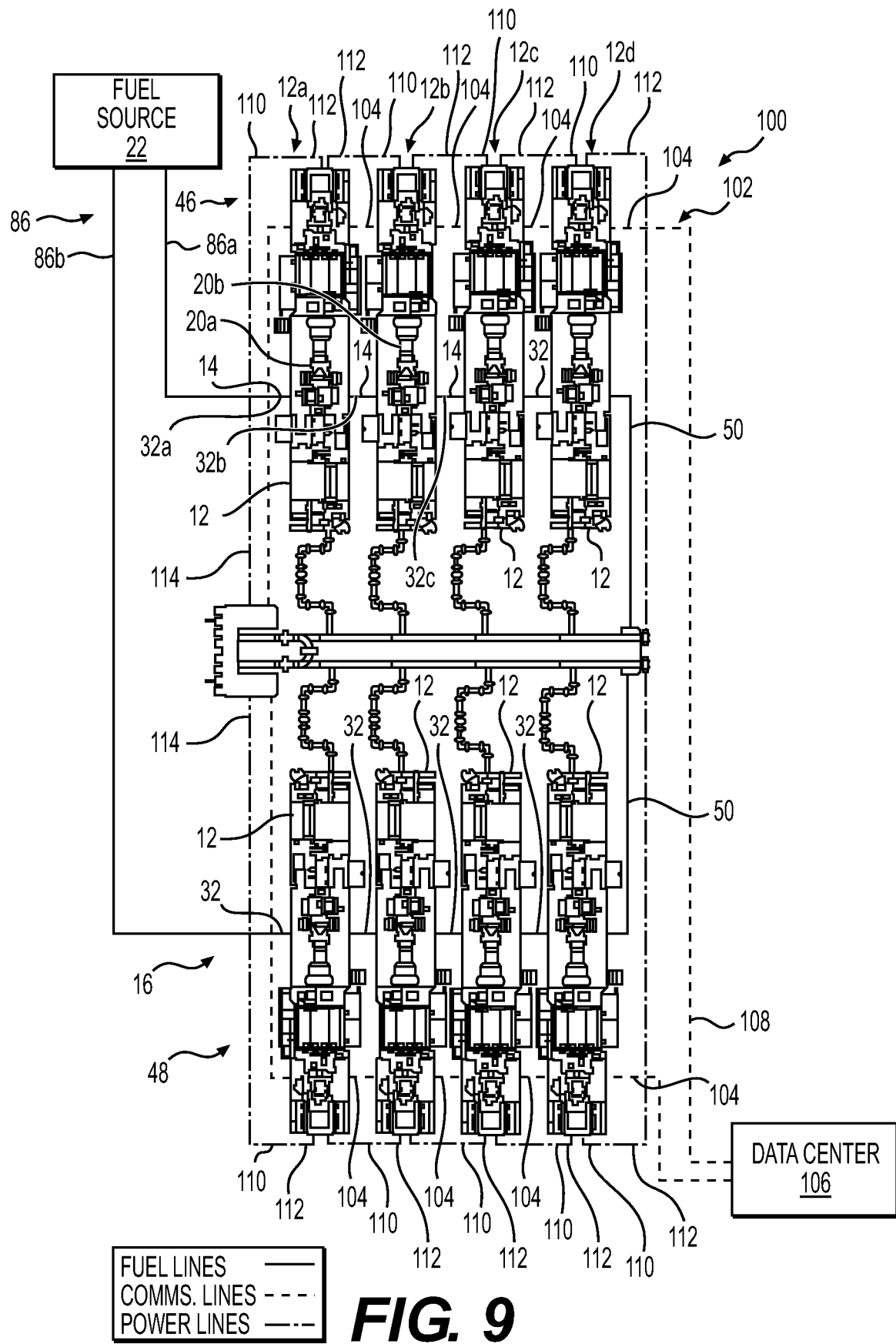
FIG. 9 is a schematic diagram showing an example system for supplying fuel, enabling communications, and conveying electric power associated with operation of a plurality of hydraulic fracturing units according to embodiments of the disclosure.

FIG. 9 is a schematic diagram showing a portion of an example hydraulic fracturing system 16 including an example system 100 for supplying fuel, enabling communications, and conveying electric power associated with operation of a plurality of hydraulic fracturing units 12 according to embodiments of the disclosure. The example system 100 shown in FIG. 9 may sometimes be referred to as a "daisy-chain" arrangement. In the example shown in FIG. 9, the system 100 includes a main fuel line 86 configured to supply fuel from a fuel source 22 to the plurality of hydraulic fracturing units 12. Each of the example hydraulic fracturing units 12 includes a chassis 30 (e.g., including a trailer and/or a truck body), a pump 18 connected to the chassis 30, and a GTE 20 connected to the chassis 30 and configured to convert fuel into a power output for operating the pump 18. In the example shown, the hydraulic fracturing units 12 are arranged into a first bank 46 of hydraulic fracturing units 12 and a second bank 48 of hydraulic fracturing units 12, and the main fuel line 86 includes a first main fuel line 86a configured to supply fuel to the first bank 46 of hydraulic fracturing units 12 and a second main fuel line 86b configured to supply fuel to the second bank 48 of the hydraulic fracturing units.

In the example system 100 shown in in FIG. 9, a fuel line connection assembly 14 is provided for each of the hydraulic fracturing units to supply fuel from the fuel source 22 to each of the GTEs 20 of the respective hydraulic fracturing units 12. The respective fuel line connection assemblies 14 may include a manifold line 32 defining an inlet end 34, an outlet end 36, and a flow path 38 for fuel extending between the inlet end 34 and the outlet end 36 (see, e.g., FIGS. 1, 2A, 2B, and 3). The manifold line 32 may be configured to provide at least a portion of a flow path for supplying fuel to a first GTE 20 of the respective hydraulic fracturing unit 12. One or more of the fuel line connection assemblies 14 may be configured to provide flow communication between the main fuel line 86 or another GTE 20 (relative to the first GTE 20 associated with the fuel line connection assembly 14) of another hydraulic fracturing unit 12 upstream of the first GTE 20, and another additional GTE 20 of another additional hydraulic fracturing unit 12 downstream of the first GTE 20.

For example, as shown in FIG. 9, the fuel line connection assembly 14 associated with a first GTE 20a of a respective first hydraulic fracturing unit 12a includes a first manifold line 32a having an inlet end configured to be in flow communication with the first main fuel line 86a and an outlet end configured to be in flow communication with an inlet end of a manifold line 32b of a second hydraulic fracturing unit 12b downstream of the first hydraulic fracturing unit 12a. The fuel line connection assembly 14 associated with a second GTE 20b of the respective second hydraulic fracturing unit 12b includes the second manifold line 32b having the inlet end configured to be in flow communication with the outlet end of the first manifold line 32a of the first hydraulic fracturing unit 12a upstream of the second hydraulic fracturing unit 12b, and an outlet end configured to be in flow communication with an inlet end of a manifold line 32c of a third hydraulic fracturing unit 12c downstream of the second hydraulic fracturing unit 12b. In some examples, this pattern may be repeated throughout the first bank 46 of hydraulic fracturing units 12a through 12d, and again throughout the second bank 48 of hydraulic fracturing units 12e though 12h.

As shown in FIG. 9, in some examples, fuel that reaches the end of the first bank 46 of the hydraulic fracturing units 12 remote from the fuel source 22 and/or fuel that reaches the end of the second bank 48 of the hydraulic fracturing units 12 remote from the fuel source 22 may be combined and/or transferred between the first bank 46 and the second bank 48, for example, via a transfer line 50 configured to provide flow communication between the first bank 46 and the second bank 48. For example, unused fuel supplied to either of the first bank 46 or the second bank 48 of hydraulic fracturing units 12 may be passed to the other bank of the two banks via the transfer line 50, thereby sharing fuel between the banks 46 and 48.

As shown in FIG. 9, the system 100 may also include, for one or more (e.g., each) of the hydraulic fracturing units 12, a communications cable assembly 102 including a length of communications cable 104 connected to a respective one of the hydraulic fracturing units 12 and configured to enable data communications between the respective hydraulic fracturing unit 12 and a data center 106 remote from the respective hydraulic fracturing unit 12 or one or more additional hydraulic fracturing units 12.

For example, as shown FIG. 9, a data center communications cable 108 may provide a communications link between the data center 106 and a first one of the hydraulic fracturing units 12. The hydraulic fracturing unit 12 may include a length of communications cable 104 that extends to a next one of the hydraulic fracturing units 12, and that hydraulic fracturing unit 12 may include a length of communications cable 104 that extends to a next one of the hydraulic fracturing units 12. In some examples, each of the hydraulic fracturing units 12 may include a length of communications cable 104 for extending to a next one of the hydraulic fracturing units 12. In this example fashion, each of the hydraulic fracturing units 12 may be linked to one another and to the data center 104. As shown in FIG. 9, in some examples, a last-in-line hydraulic fracturing unit 12 may include a length of communications cable 104 that runs to the data center 106, thus resulting in a continuous communications link, by which one or more of the hydraulic fracturing units 12 may be in communication with the data center 104. In some examples, the data center 104 may be configured to transmit communications signals and/or receive communications signals, and the communications signals may include data indicative of operation of one or more of the plurality of hydraulic fracturing units 12, including, for example, parameters associated with operation of the pumps 18 and/or the GTEs 20, as well as additional data related to other parameters associated with operation and/or testing of one or more of the hydraulic fracturing units 12.

In some examples, the communications cable 104 may include a first end configured to be connected to a first unit interface connected to a respective hydraulic fracturing unit 12. The length of communications cable 104 may also include a second end configured to be connected to a data center interface of the data center 106 or a second unit interface connected to another one of the hydraulic fracturing units 12. One or more of the first end or the second end of the length of communications cable 104 may include or be provided with a quick connecter configured to be connected to one or more of the first unit interface or the data center interface, for example, as discussed herein with respect to FIG. 18.

In some examples, the communications cable assembly 102 may also include a communications cable storage apparatus connected to the respective hydraulic fracturing unit 12 and configured to store the length of communications cable 104 when not in use and to facilitate deployment of at least a portion of the length of communications cable 104 for connection to the data center 106 or the another hydraulic fracturing unit 12. The communications cable storage apparatus may include a cable reel configured to be connected to the hydraulic fracturing unit 12 and/or a cable support configured to be connected to the hydraulic fracturing unit 12 and to receive windings of at least a portion of the length of communications cable 104.

As shown in FIG. 9, some examples of the system 100 may also include a power cable assembly 110 including a length of power cable 112 connected to one or more (e.g., each) of the hydraulic fracturing units 12 and configured to convey electric power between the hydraulic fracturing units 12 and a remote electrical power source or one or more additional hydraulic fracturing units 12 of the hydraulic fracturing system 16. For example, as shown in FIG. 9, a length of power cable 112 is connected to each of the hydraulic fracturing units 12, and each of the lengths of power cable 112 are configured to be connected to a next-in-line hydraulic fracturing unit 12. In some examples, the length of power cable 112 may extend from one hydraulic fracturing unit 12 to another hydraulic fracturing unit 12 other than a next-in-line hydraulic fracturing unit 12. One or more of the lengths of power cable 112 may include a first end including a power plug configured to be received in a power socket, for example, as discussed herein with respect to FIG. 19.

In some examples, one or more of the power cable assemblies 110 may also include a power cable storage apparatus configured to be connected to the respective hydraulic fracturing unit 12. The power cable storage apparatus, in some examples, may be configured to store the length of power cable 112 when not in use and to facilitate deployment of at least a portion of the length of power cable 112 for use.

As shown in FIG. 9, each of the hydraulic fracturing units 12 in the example shown includes a length of power cable 112. In some such examples, each of the hydraulic fracturing units 12 is configured to supply and/or generate its own electric power, for example, by operation of a generator connected to the GTE 20 and/or to another source of mechanical power, such as another gas turbine engine or reciprocating piston engine (e.g., a diesel engine). In the example configuration shown in FIG. 9, the lengths of power cable 112 run between each of the hydraulic fracturing units 12, thus connecting all the hydraulic fracturing units 12 to one another, such that power may be shared among at least some or all of the hydraulic fracturing units 12. Thus, if one or more of the hydraulic fracturing units 12 is unable to generate its own electric power or is unable to generate a sufficient amount of electric power to meet its operation requirements, electric power from one or more of the remaining hydraulic fracturing units 12 may be used to mitigate or overcome the electric power deficit. As shown additional lengths of power cable 114 may be included in the system 100 to supply electric power between the two banks 46 and 48 of the hydraulic fracturing units 12.

Figure 10:
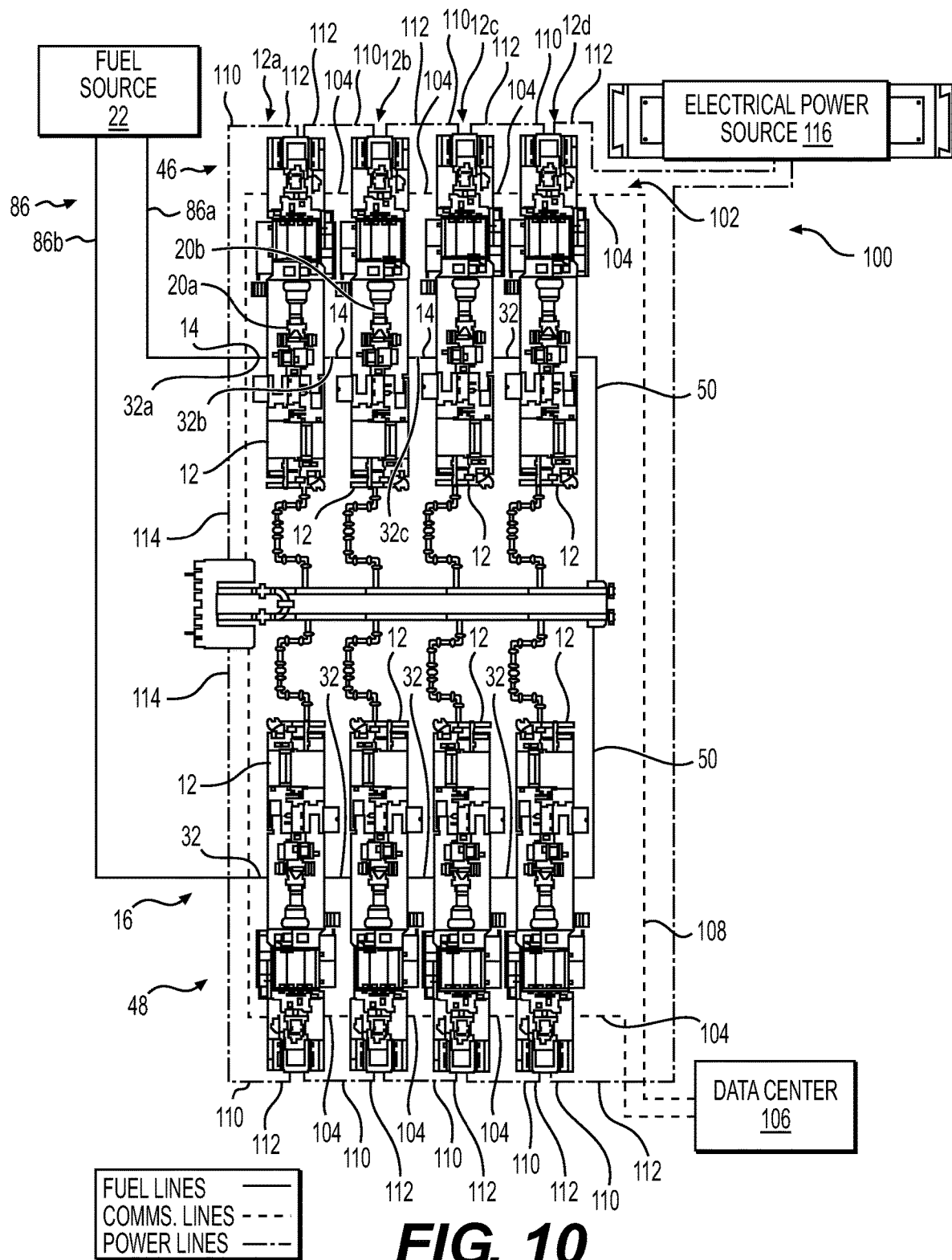
FIG. 10 is a schematic diagram showing another example system for supplying fuel, enabling communications, and conveying electric power associated with operation of a plurality of hydraulic fracturing units according to embodiments of the disclosure.

FIG. 10 is a schematic diagram showing another example system 100 for supplying fuel, enabling communications, and conveying electric power associated with operation of a plurality of hydraulic fracturing units 12 according to embodiments of the disclosure. The example system 100 shown in FIG. 10 is similar to the example system 100 shown in FIG. 9, except that the example system 100 shown in FIG. 10 includes an electrical power source 116 located remotely from each of the hydraulic fracturing units 12, for example, such that the electrical power source 116 is not mechanically connected directly to the chassis 30 of one or more of the hydraulic fracturing units 12. In some examples, the electrical power source 116 may include one or more of one or more power generation devices or one or more batteries. For example, the electrical power source 116 may include one or more gensets (e.g., including an internal combustion engine-driven electrical generator) and/or one or more electric power storage devices, such as, for example, one or more batteries.

As shown in FIG. 10, the electrical power source 116 may be electrically coupled to one or more of the first bank 46 or the second bank 48 of the hydraulic fracturing units 12 via an additional length of power cable 114, and in some examples, the first bank 46 and the second bank 48 of hydraulic fracturing units 12 may be, electrically coupled to one another via additional lengths of power cable 114. In at least some such examples, even if one or more of the hydraulic fracturing units 12 lacks electric power, electric power may be supplied to that particular hydraulic fracturing unit 12 via power cables 104 and/or 114, thereby providing an ability to continue operations of the hydraulic fracturing units 12.

Figure 11:
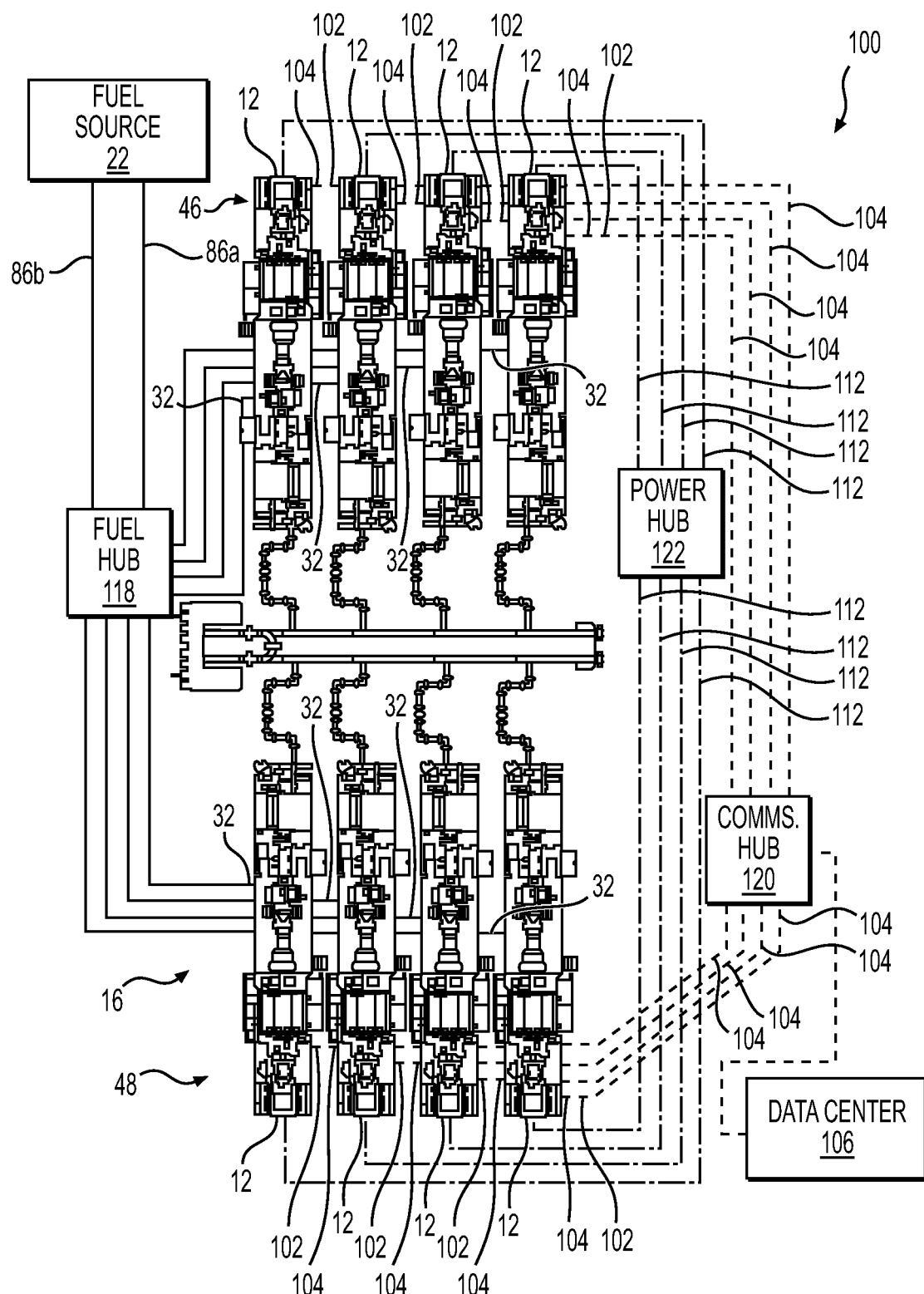
FIG. 11 is a schematic diagram showing a further example system for supplying fuel, enabling communications, and conveying electric power associated with operation of a plurality of hydraulic fracturing units according to embodiments of the disclosure.

FIG. 11 is a schematic diagram showing a further example system 100 for supplying fuel, enabling communications, and conveying electric power associated with operation of a plurality of hydraulic fracturing units 12 according to embodiments of the disclosure. The example system 100 shown in FIG. 11 may sometimes be referred to as a "hub and spoke" arrangement. In the example shown in FIG. 11, the system 100 includes a fuel source 22 for supplying fuel to the plurality of hydraulic fracturing units 12, and a fuel hub 118 for distributing the fuel from the fuel source 22 to each of the plurality of hydraulic fracturing units 12. For example, the fuel hub 118 may be in flow communication with the fuel source 22 via the main fuel lines 86a and 86b, and the fuel hub 118 may be in flow communication with each of the fuel line connection assemblies 14 of each of the respective hydraulic fracturing units 12 (see, e.g., FIGS. 1, 2A, 2B, and 3). In the example shown, the inlet end 34 of each of the manifold lines 32 of the each of the hydraulic fracturing units 12 is connected to an outlet of the main fuel line 86, for example, via the fuel hub 118. In some such examples, the outlet end 36 of each of the manifold lines 32 of the respective hydraulic fracturing units 12 is connected to a blocking device configured to prevent flow from the outlet end 36 of the manifold line 32.

In the example shown in FIG. 11, the system 100 includes a data center 106 located remotely from each of the hydraulic fracturing units 12 (e.g., the data center 106 is not mechanically connected to the chassis 30 of any of the hydraulic fracturing units 12). The data center 106 is communicatively connected to a communications hub 120, and each of the hydraulic fracturing units 12 is communicatively connected to the communications hub 120 by their respective communications cable assemblies 102, including the respective communications cables 104.

In the example shown in FIG. 11, the system 100 also includes a power hub 122 electrically connected to each of the hydraulic fracturing units 12 via the respective power cable assemblies 110, including the respective power cables 112. In some examples, the power hub 122 may be configured to supply electric power to any of the hydraulic fracturing units 12 unable to supply its own electric power and/or unable to provide a sufficient amount of its own electric power. For example, at least some of the hydraulic fracturing units 12 may be configured to generate electric power, for example, via one or more genets mounted to the respective chassis 30 of the respective hydraulic fracturing unit 12. Any excess electric power generated by one or more of the hydraulic fracturing units 12 may be electrically communicated to the power hub 122 via the respective power cable assembly 110. Such excess power may be electrically communicated from the power hub 122 to any of the hydraulic fracturing units 12 lacking sufficient electric power via the respective power cable assembly 110.

Figure 12:
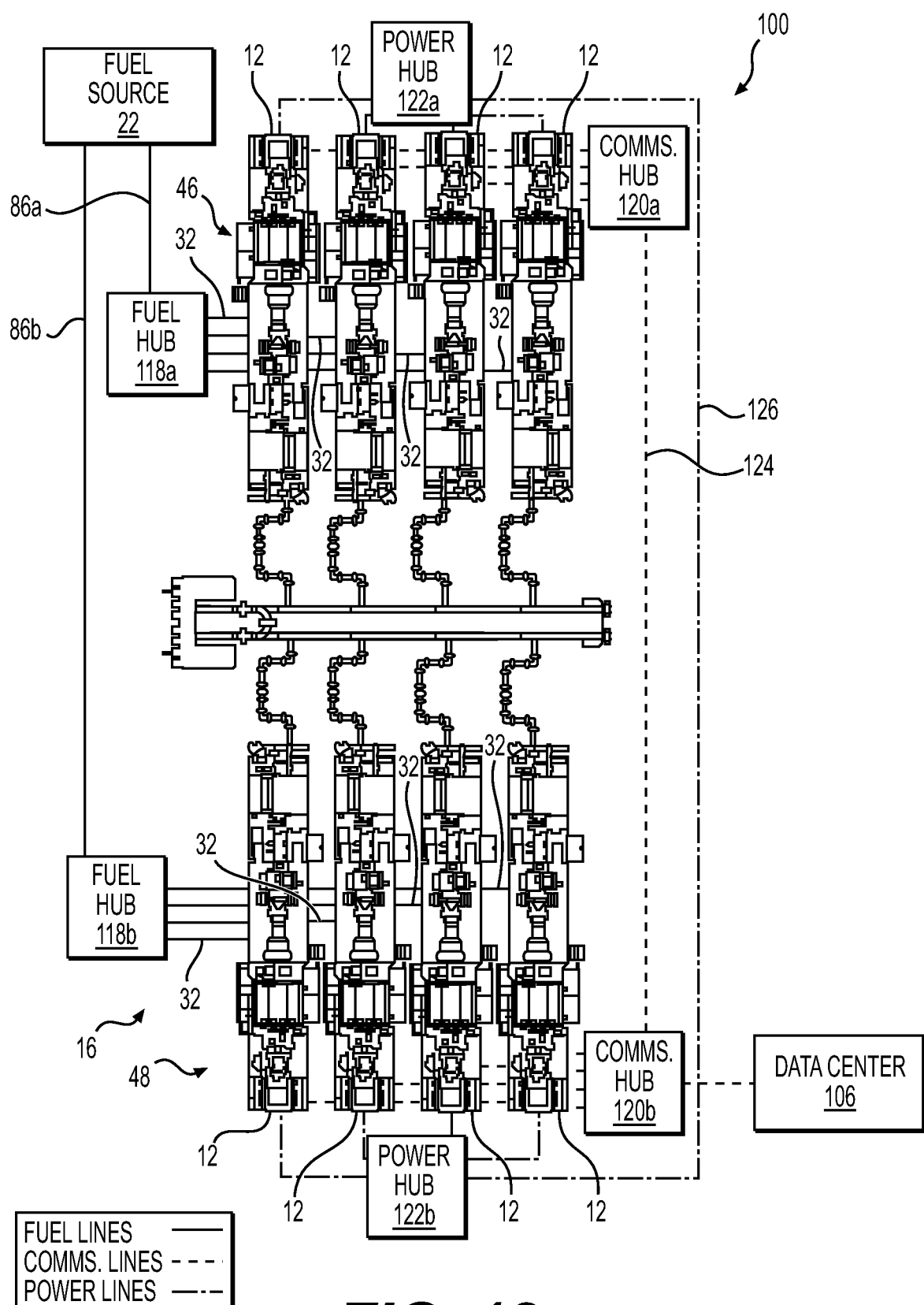
FIG. 12 is a schematic diagram showing another example system for supplying fuel, enabling communications, and conveying electric power associated with operation of a plurality of hydraulic fracturing units according to embodiments of the disclosure.

FIG. 12 is a schematic diagram showing another example system 100 for supplying fuel, enabling communications, and conveying electric power associated with operation of a plurality of hydraulic fracturing units 12 according to embodiments of the disclosure. The example system 100 shown in FIG. 12 is similar to the example system 100 shown in FIG. 11, except that it includes a first fuel hub 118*a* and a second fuel hub 118*b*, a first communications hub 120*a* and a second communications hub 120*b*, and a first power hub 122*a* and a second power hub 122*b*, each respectively supplying fuel, communications, and electric power, to the first bank 46 of hydraulic fracturing units 12 and the second bank 48 of the hydraulic fracturing units 12.

For example, a first main fuel line 86*a* may provide flow communication from the fuel source 22 to the first fuel hub 118*a*, and the second main fuel line 86*b* may provide flow communication from the fuel source 22 to the second fuel hub 118*b*. The first and second fuel hubs 118*a* and 118*b* may respectively supply fuel to each of the manifold lines 32 of the respective hydraulic fracturing units 12 of each of the first and second banks 46 and 48 of the hydraulic fracturing units 12. The first communications hub 120*a* may be communicatively connected to each of the hydraulic fracturing units 12 of the first bank 46, and the second communications hub 120*b* may be communicatively connected to each of the hydraulic fracturing units 12 of the second bank 48, for example, via the communications cable assembly 102 of each of the hydraulic fracturing units 12. In some examples, one or more of the first communications hub 120*a* or the second communications hub 120*b* may be communicatively connected to the data center 104, for example, as shown in FIG. 12. In some examples, the first and second communications hubs 120*a* and 120*b* may be communicatively linked via an intermediate communications cable 124, for example, as shown in FIG. 12.

As shown in FIG. 12, each of the first and second power hubs 122*a* and 122*b* may be electrically connected to the first bank 46 and second bank 48, respectively, of the hydraulic fracturing units 12, for example, via the respective power cable assemblies 110 of each of the hydraulic fracturing units 12. As shown in FIG. 12, in some examples, the first power hub 122*a* and the second power hub 122*b* may be electrically connected to one another via an intermediate power cable 126. In some examples, the first and second power hubs 122*a* and 122*b* may be configured to supply electric power to any of the hydraulic fracturing units 12 unable to supply its own electric power and/or unable to provide a sufficient amount of its own electric power. For example, at least some of the hydraulic fracturing units 12 may be configured to generate electric power, for example, via one or more genets mounted to the respective chassis 30 of the respective hydraulic fracturing unit 12. Any excess electric power generated by one or more of the hydraulic fracturing units 12 may be electrically communicated to the first and second power hubs 122*a* and 122*b* via the respective power cable assembly 110. Such excess power may be electrically communicated from one or more of the first and second power hubs 122*a* and/or 122*b* to any of the hydraulic fracturing units 12 lacking sufficient electric power via the respective power cable assembly 110.

Figure 13:
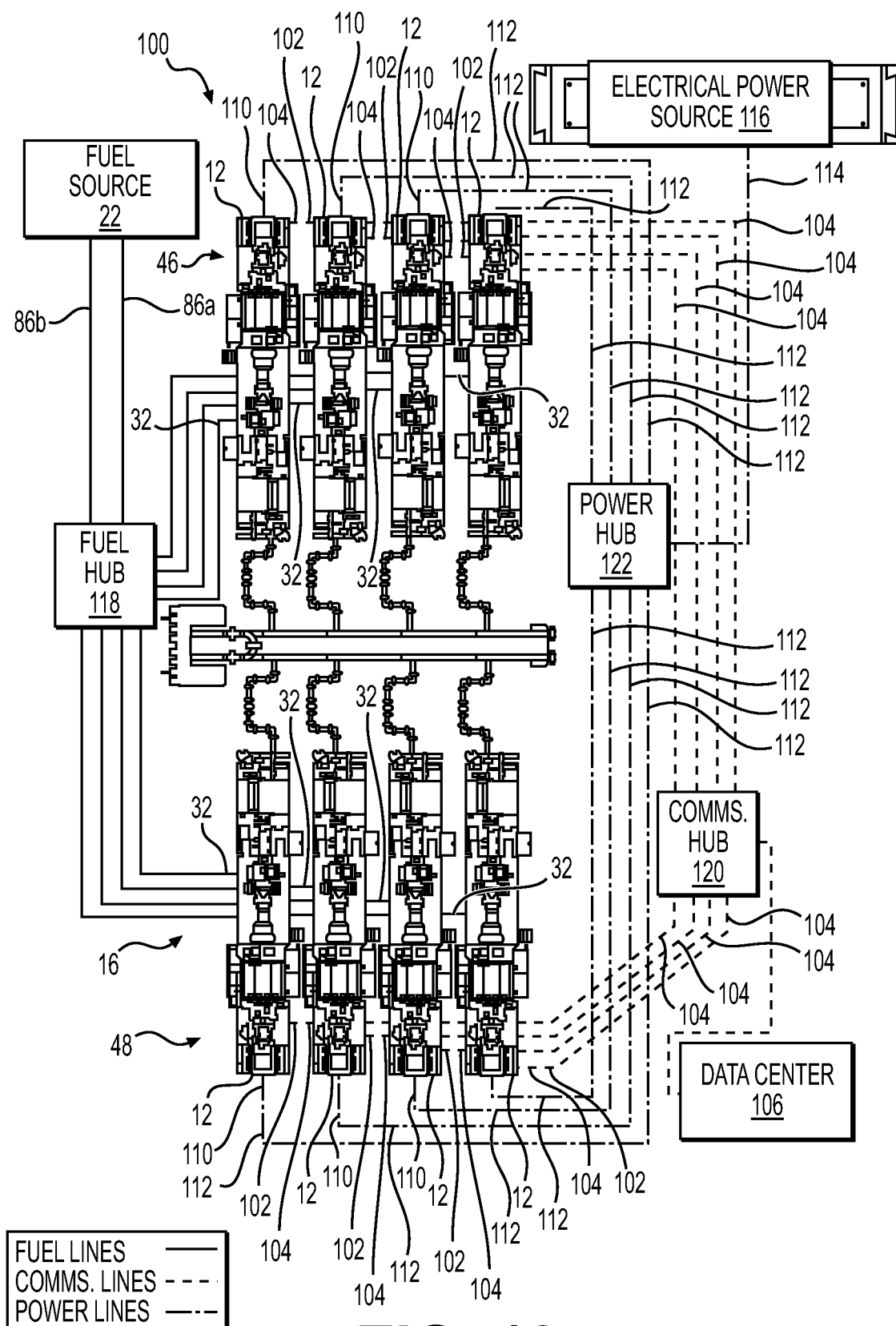
FIG. 13 is a schematic diagram showing a further example system for supplying fuel, enabling communications, and conveying electric power associated with operation of a plurality of hydraulic fracturing units according to embodiments of the disclosure.

FIG. 13 is a schematic diagram showing a further example system 100 for supplying fuel, enabling communications, and conveying electric power associated with operation of a plurality of hydraulic fracturing units 12 according to embodiments of the disclosure. The example system shown in FIG. 13 is similar to the example system 100 shown in FIG. 11, except that the system 100 shown in FIG. 13 includes an electrical power source 116 located remote from the hydraulic fracturing units 12 (e.g., not mechanically connected to any of the chassis 30 of the hydraulic fracturing units 12). The electrical power source 116 may be electrically connected to the power hub 122 via an additional length of power cable 114, and the power hub 122 may be electrically connected to each of hydraulic fracturing units 12 via their respective power cable assemblies 110, for example, as shown in FIG. 13.

Figure 14:
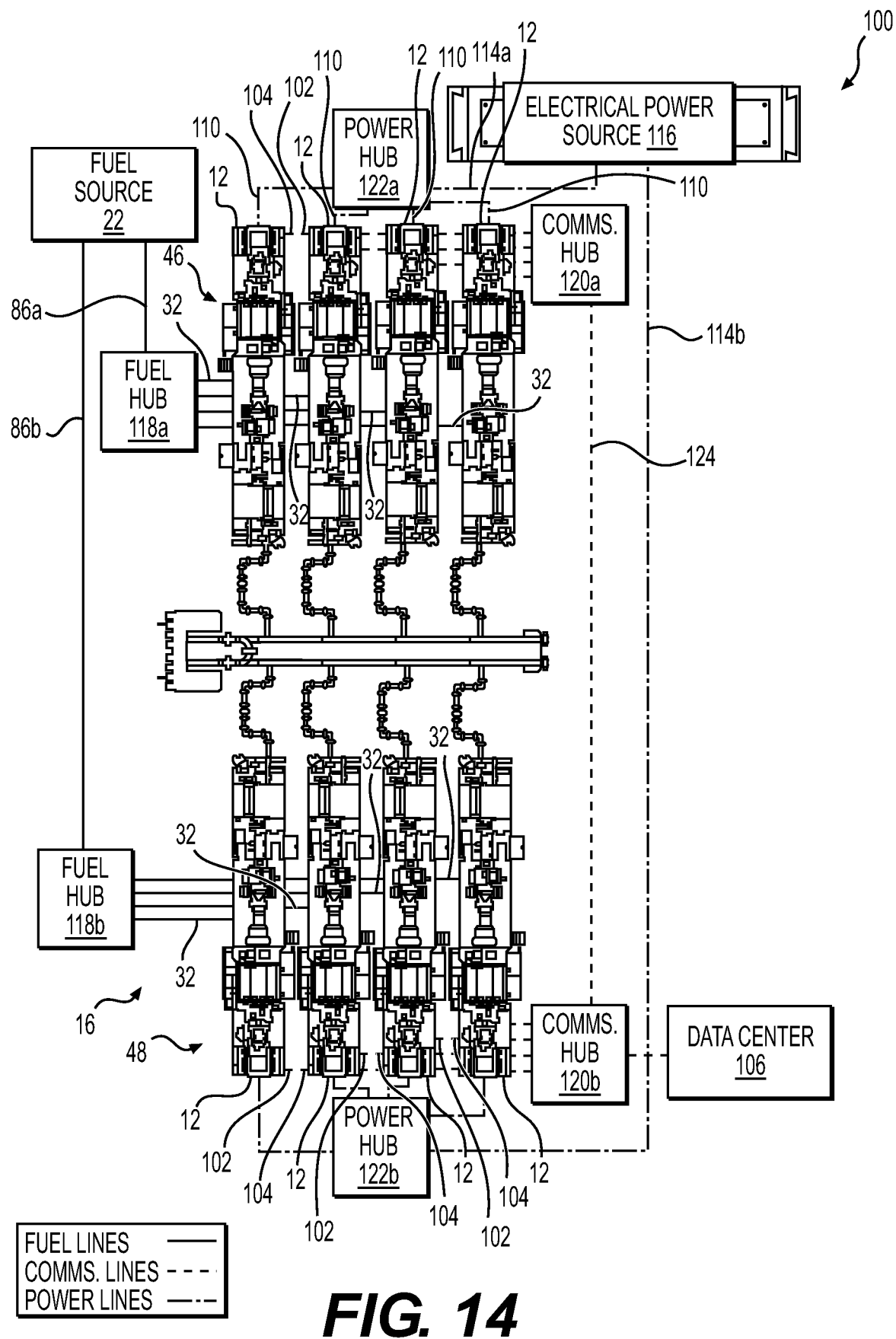
FIG. 14 is a schematic diagram showing another example system for supplying fuel, enabling communications, and conveying electric power associated with operation of a plurality of hydraulic fracturing units according to embodiments of the disclosure.

FIG. 14 is a schematic diagram showing another example system 100 for supplying fuel, enabling communications, and conveying electric power associated with operation of a plurality of hydraulic fracturing units 12 according to embodiments of the disclosure. The example system 100 shown in FIG. 14 is similar to the example system 100 shown in FIG. 12, except that the system 100 shown in FIG. 14 includes an electrical power source 116 located remote from the hydraulic fracturing units 12 (e.g., not mechanically connected to any of the chassis 30 of the hydraulic fracturing units 12). The electrical power source 116 may be electrically connected to the first power hub power hub 122*a* via a first additional length of power cable 114*a*, and connected to the second power hub power hub 122*b* via a second additional length of power cable 114*b*. The first and second power hubs 122*a* and 122*b* may be electrically connected to each of hydraulic fracturing units 12 via their respective power cable assemblies 110, for example, as shown in FIG. 14.

Figure 15:
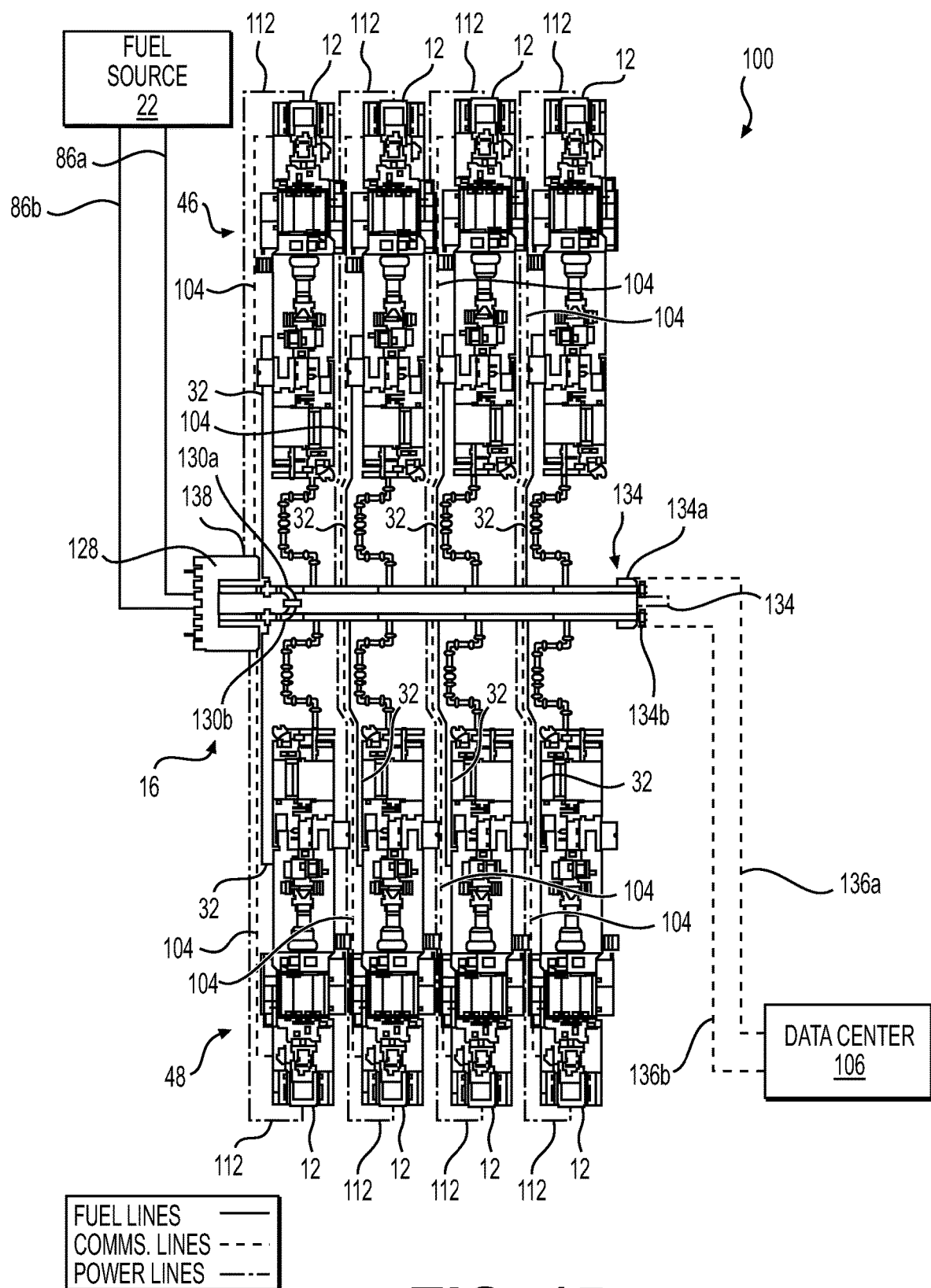
FIG. 15 is a schematic diagram showing a further example system for supplying fuel, enabling communications, and conveying electric power associated with operation of a plurality of hydraulic fracturing units according to embodiments of the disclosure.

FIG. 15 is a schematic diagram showing a further example system 100 for supplying fuel, enabling communications, and conveying electric power associated with operation of a plurality of hydraulic fracturing units 12 according to embodiments of the disclosure. In the example system 100 shown in FIG. 15, the system 100 may include a main fuel manifold 128 in flow communication with the fuel supply 22 via a first main fuel line 86*a* and a second main fuel line 86*b*. In some examples, the main fuel manifold 128 may be mounted on a trailer or a truck body for portability (e.g., on a high-pressure iron manifold trailer) or supported by the ground. In the example shown, the main fuel manifold 128 includes a first fuel line 130*a* and a second fuel line 130*b* running along the length of the main fuel manifold 128. In some examples, each of the first and second fuel lines 130*a* and 130*b* may include a plurality of valves, each of which may be in flow communication with a respective manifold line 32 of each of the hydraulic fracturing units 12. The first fuel line 130*a* may be configured to supply fuel to the first bank 46 of hydraulic fracturing units 12, and the second fuel line 130*b* may be configured to supply fuel to the second bank 48 of the hydraulic fracturing units 12, for example, via the respective manifold lines 32 of the respective hydraulic fracturing units 12. In some examples, the first fuel line 130*a* and the second fuel line 130*b* may be in flow communication with one another via an intermediate fuel line 132, which, in some examples, may assist with equalizing pressure and/or volume between the first fuel line 130*a* and the second fuel line 130*b*.

The example system 100 shown in FIG. 15 also includes a communications harness 134 in communication with the data center 106, for example, via a first communications cable 136*a* and a second communications cable 136*b*. In some examples, the communications harness 134 may be mounted on a trailer or a truck body for portability (e.g., on a high-pressure iron manifold trailer) or supported by the ground. In some examples, the communications harness 134 may include a plurality of connection points along its length configured to facilitate connection to a communications cable 104 from each of the respective hydraulic fracturing units 12 to provide a communications link between each of the hydraulic fracturing units 12 and the data center 106. As shown, some examples of the communications harness 134 may include a first communications harness 134*a* and a second communications harness 134*b* configured to respectively provide communications links with the first bank 46 and the second bank 48 of the hydraulic fracturing units 12.

As shown in FIG. 15, the example system 100 also includes a power harness 138 in electrical communication with the plurality of power cables 112 of the respective hydraulic fracturing units 12. In some examples, the power harness 138 may be mounted on a trailer or a truck body for portability (e.g., on a high-pressure iron manifold trailer) or supported by the ground. In some examples, the power harness 138 may include a plurality of power receptacles located along its length and configured to facilitate connection with a power plug of a respective power cable 112 from each of the respective hydraulic fracturing units 12 to provide a power link between each of the hydraulic fracturing units 12. In some examples, any excess electric power generated by one or more of the hydraulic fracturing units 12 may be electrically supplied to the power harness 138 via the respective power cable assembly 110. Such excess power may be electrically communicated to any of the hydraulic fracturing units 12 lacking sufficient electric power via the respective power cable assembly 110.

In the example shown in FIG. 15, the power harness 138 includes a first power harness line 140*a* and a second power harness line 140*b* configured to supply electric power to the first bank 46 and the second bank 48 of the hydraulic fracturing units 12, respectively. In some examples, an intermediate power cable 142 may be provided to electrically connect the first power harness line 140*a* and the second power harness line 140*b* to one another, for example, so that electric power may be shared between the first power harness line 140*a* and the second power harness line 140*b*.

Figure 16:
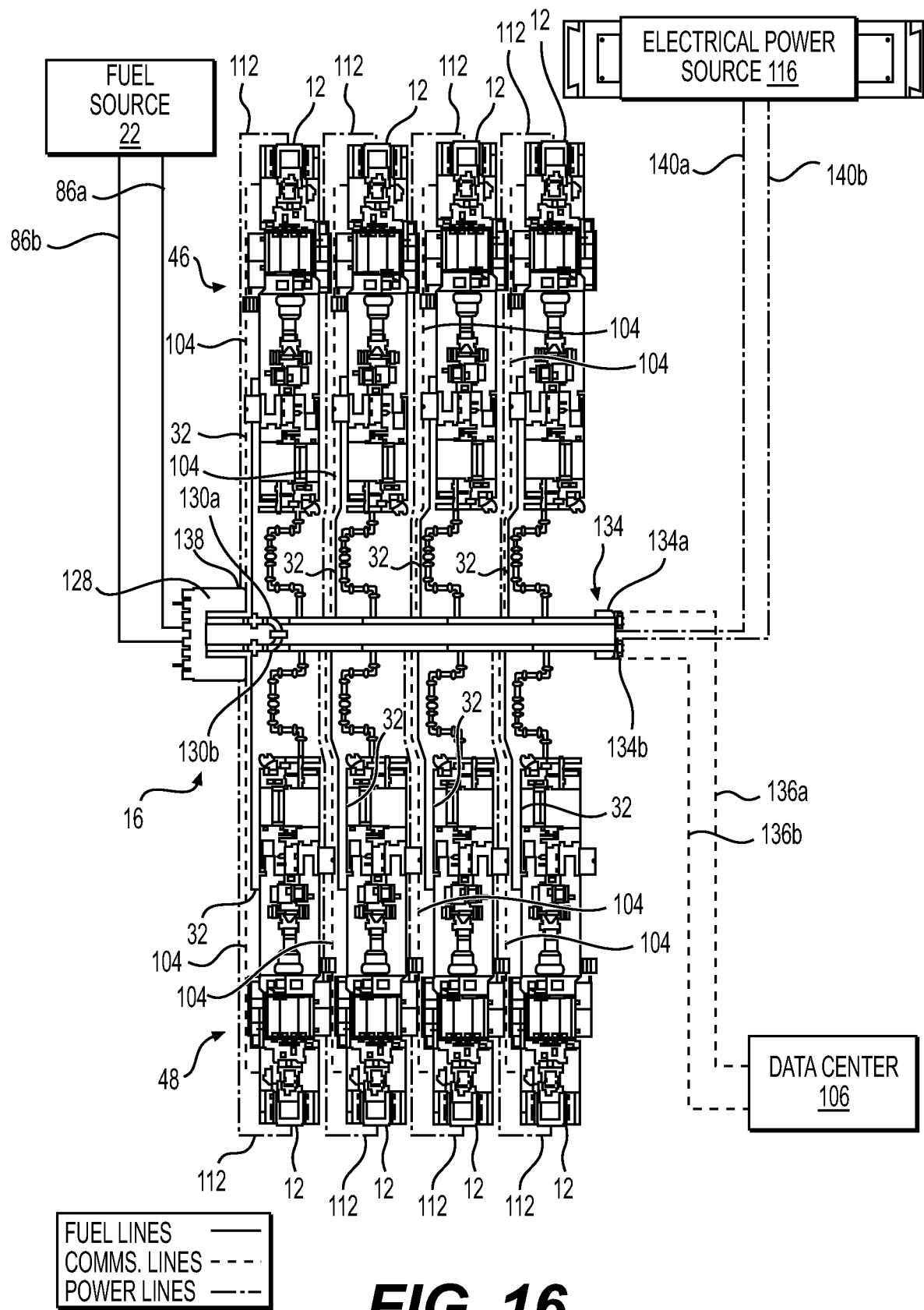
FIG. 16 is a schematic diagram showing another example system for supplying fuel, enabling communications, and conveying electric power associated with operation of a plurality of hydraulic fracturing units according to embodiments of the disclosure.

FIG. 16 is a schematic diagram showing another example system 100 for supplying fuel, enabling communications, and conveying electric power associated with operation of a plurality of hydraulic fracturing units 12 according to embodiments of the disclosure. The example system 100 is similar to the example system 100 shown in FIG. 15, except that that the example 100 shown in FIG. 16 includes an electrical power source 116 located remote from the hydraulic fracturing units 12 (e.g., not mechanically connected to any of the chassis 30 of the hydraulic fracturing units 12). The electrical power source 116 may be electrically connected to the first and second power harness lines 140*a* and 140*b* via first and second additional lengths of power cable 114*a* and 114*b*, respectively. The first and second power harness lines 140*a* and 140*b* may be electrically connected to each of hydraulic fracturing units 12 via their respective power cable assemblies 110, for example, as shown in FIG. 16.

Figure 17A:
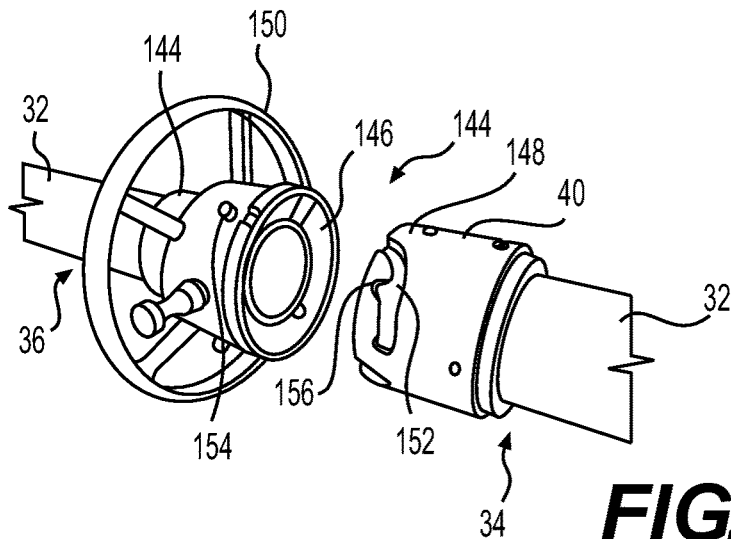
FIG. 17A is a perspective view of an example quick connect coupling for coupling two fuel lines to one another shown in an uncoupled condition according to embodiments of the disclosure.
Figure 17B:
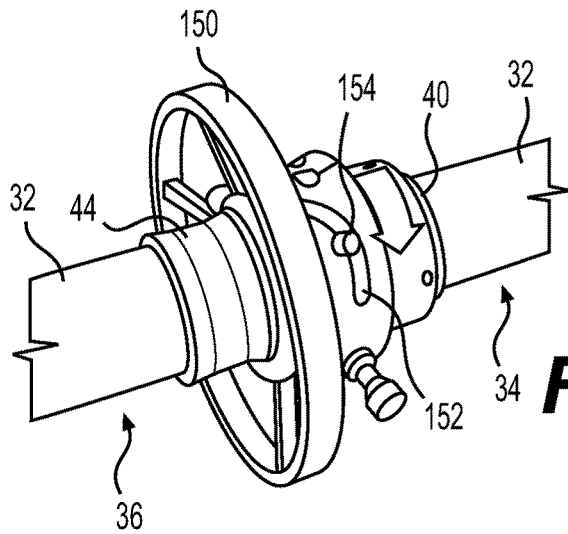
FIG. 17B is a perspective view of the example quick connect coupling shown in FIG. 17A shown in a coupled condition according to embodiments of the disclosure.

FIG. 17A is a perspective view of an example quick connect coupling 144 for coupling two fuel lines 146 to one another shown in an uncoupled condition according to embodiments of the disclosure. FIG. 17B is a perspective view of the example quick connect coupling 144 shown in FIG. 17A shown in a coupled condition according to embodiments of the disclosure. The quick connect coupling 144 may be used with the manifold lines 32 disclosed herein, for example, to couple an inlet end 34 of a first manifold line 32 to an outlet end 36 of a fuel line in flow communication with a fuel source and/or to an outlet end 36 of another manifold line 32 of another hydraulic fracturing unit 12 upstream relative to the first manifold line 32. In addition, the outlet end 36 of the first manifold line 32 may be coupled to an inlet end 34 of yet another manifold line 32 of yet another hydraulic fracturing unit 12 downstream relative to the first manifold line 32 or to a blocking device configured to prevent flow communication from the outlet end of the first manifold line 32. This example configuration may facilitate use of the manifold line 32 to connect manifold lines 32 of multiple hydraulic fracturing units 12 in series or individually to a fuel line from a fuel source.

As shown in FIG. 17A, an outlet end 36 of a first manifold line 32 may include an outlet coupling 44 of the quick connect coupling 144, and the inlet end 34 of a second manifold line 32 may include an inlet coupling 40 of the quick connect coupling 144. In some examples, this may be reversed. As shown in FIG. 17A, the example outlet coupling 44 may include an annular recess 146 configured to receive an annular projection 148 of the inlet coupling 40. In some examples, the outlet coupling 44 may also include a handle 150 (e.g., an annular handle) configured to facilitate rotation of the outlet coupling 44 relative to the inlet coupling 40, once the annular projection 148 is received in the annular recess 146 of the outlet coupling 44. The annular projection 148 may define a groove or slot 152 configured to receive a pin 154 associated with the annular recess 146. When coupling the outlet coupling 44 to the inlet coupling 40, the annular projection 148 is inserted into the annular recess 146, such that the pin 154 is aligned with a leading edge of the groove or slot 152, so that the annular projection 148 can be inserted into the annular recess 146, while twisting the outlet coupling 44 relative to the inlet coupling 40, so that the pin 154 travels in the groove or slot 152 until the pin 154 is able to engage a notch 156 in the groove or slot 152, thereby locking the rotational relationship between the outlet coupling 44 and the inlet coupling 40, for example, as shown in FIG. 17B, which shows the example couplings 40 and 44 engaged with one another. In some examples, the groove or slot 152 may be configured such that the outlet coupling 44 engages with the inlet coupling 40 upon twisting the outlet coupling 44 about one-quarter turn relative to the inlet coupling 40. Other amounts of relative twist for coupling are contemplated. In some examples, the quick connect coupling 144 may include one or more fluid seals configured to prevent fuel from leaking from the quick connect coupling 144. In some examples, the quick connect coupling shown in FIGS. 17A and 17B may include a pressure safety lock.

Figure 17C:
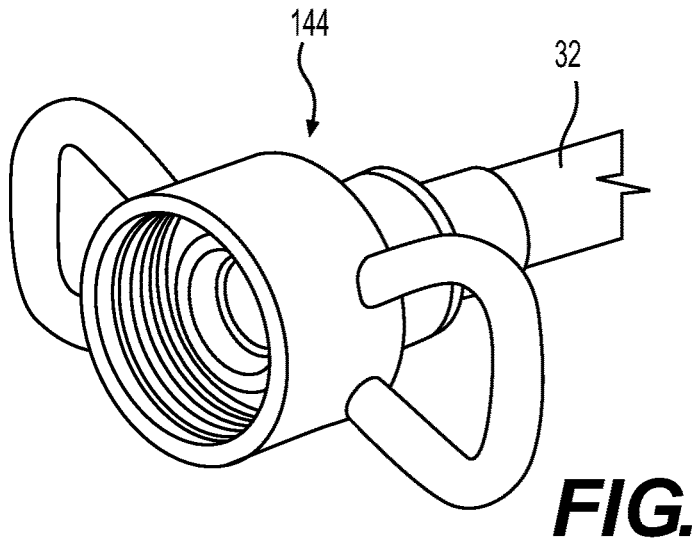
FIG. 17C is a perspective view of another example quick connect coupling for coupling two fuel lines to one another shown in an uncoupled condition according to embodiments of the disclosure.

FIG. 17C is a perspective view of one-half of another example quick connect coupling 144 for coupling two fuel lines to one another shown in an uncoupled condition according to embodiments of the disclosure. The example one-half quick connect coupling 144 shown in FIG. 17C may be configured to threadedly engage another half of the quick connect coupling 144 (e.g., via complimentary male and female threads). In some examples, the quick connect coupling 144 shown in FIG. 17C may include a transfer-loading safety quick coupler.

In some examples, the quick connect coupling 144 may facilitate quickly coupling two or more manifold lines 32 to one another, and/or quickly coupling a manifold line 32 to a fuel line from a fuel source, to a fuel hub, and/or to a blocking device configured to prevent the flow of fuel from the outlet end of the manifold line 32. This may facilitate connection and/or disconnection of manifold lines 32 during set-up or break-down of the hydraulic fracturing system 16. In some examples, the quick connect coupling 144 may facilitate such set-up and assembly without the use of tools. In some examples, the quick connect couplings 144 may help prevent improperly coupling two inlets to one another or two outlets to one another, which may prevent unintended problems with the fuel delivery system.

Figure 18:
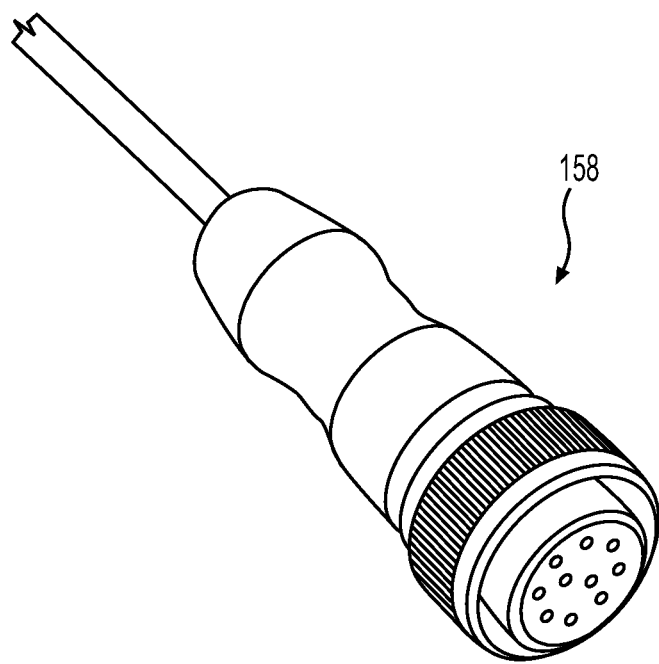
FIG. 18 is a perspective view of an example communications coupling for a communications cable according to embodiments of the disclosure.

FIG. 18 is a perspective view of an example communications coupling 158 for coupling a communications cable from one device to another device according to embodiments of the disclosure. In some examples, the communications coupling 158 may be configured to couple an end of a length of communications cable 104 of a communications assembly 102 associated with a hydraulic fracturing unit 12 to a communications interface of, for example, another hydraulic fracturing unit 12, a communications interface at a data center 106, and/or a communications interface at a communications hub 120, for example, such as those described herein. The communications coupling 158 may, in some examples, be configured to provide a weather-tight quick connection, for example, such as a mil-spec connector. The communications coupling 158 may include a mating pair (e.g., a plug and a receptacle), including a male (e.g., pin) or female (e.g., socket) contact. In some examples, one or more of the coupling halves (e.g., the male or female halves) and/or the respective contacts may be floating, for example, to minimize mechanical stress at the coupling 158. In some examples, the communication cables 104 may have a capacity ranging from 12 volts to 24 volts and may be shielded to prevent communication from high power energy sources from distorting signals communicated via the communications cables 104.

In some examples, the communications coupling 158 may facilitate quickly communicatively coupling two or more devices or machines to one another. This may facilitate connection and/or disconnection of communications cables 104 during set-up or break-down of the hydraulic fracturing system 16. In some examples, the communications coupling 158 may facilitate such set-up and assembly without the use of tools. In some examples, the communications couplings 158 may be configured to have unique communication coupling pairs to prevent coupling the communications cable 104 into an incorrect receptacle, thereby reducing the likelihood of an incorrect rigging and incorrect transfer of data. Other types of communications couplings are contemplated.

Figure 19:
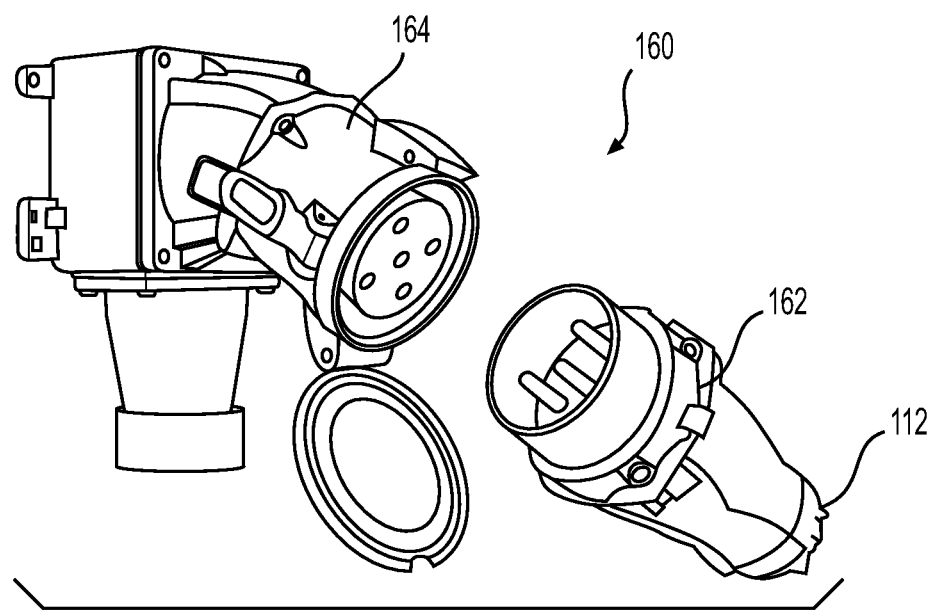
FIG. 19 is a perspective view of an example power coupling for coupling a power cable shown in an uncoupled condition according to embodiments of the disclosure.

FIG. 19 is a perspective view of an example power coupling 160 configured to couple a power cable 112 to a device according to embodiments of the disclosure. As shown in FIG. 19, the power coupling 160 may include a power plug 162 connected to an end of a power cable 112, and a power receptacle 164. For example, the power cable 112 may be connected to a first hydraulic fracturing unit 12, and the power receptacle 164 may be connected to another hydraulic fracturing unit 12, a power hub 122, and/or an electrical power source 116. The power plug 162 may be configured to be inserted into a power receptacle 164 to provide electric power transfer between a device or machine coupled to the power cable 112 and power plug 162, and the device or machine coupled to the power receptacle 164. In some examples, the power coupling 160 include a shore power connector-type that may be configured to be waterproof, locking, and/or capable of handling three-phase, 480 volts, and/or 400 amps, although power couplings of other types and/or having different capabilities are contemplated.

In some examples, the power coupling 160 may facilitate quickly electrically coupling two or more devices or machines to one another. This may facilitate connection and/or disconnection of power cables 112 during set-up or break-down of the hydraulic fracturing system 16. In some examples, the power coupling 160 may facilitate such set-up and assembly without the use of tools.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of any appended claims and equivalents thereto, the invention may be practiced other than as specifically described.

This is a continuation of U.S. Non-Provisional application Ser. No. 15/929,708, filed May 18, 2020, titled "FUEL, COMMUNICATIONS, AND POWER CONNECTION SYSTEMS AND RELATED METHODS," which claims priority to and the benefit of U.S. Provisional Application No. 62/900,100, filed Sep. 13, 2019, titled "ON BOARDING HOSES AND ELECTRICAL CONNECTIONS", U.S. Provisional Application No. 62/900,112, filed Sep. 13, 2019, titled "FUEL LINE CONNECTION SYSTEM AND METHODS FOR SAME", and U.S. Provisional Application No. 62/704,401, filed May 8, 2020, titled "FUEL, COMMUNICATIONS, AND POWER CONNECTION SYSTEMS AND RELATED METHODS", the entire disclosures of all of which are incorporated herein by reference.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further can be made thereto without departing from the spirit and scope of the present invention as set forth in the appended claims.

What is claimed is:

1. A method for pressure testing at least a portion of a fuel delivery system for supplying fuel from a fuel source to a plurality of gas turbine engines, the method comprising:
 causing a first valve to be in an open condition, the first valve configured to one of facilitate flow communication or prevent flow communication between the fuel source and a first gas turbine engine of the plurality of gas turbine engines;
 causing a second valve to be in a closed condition, the second valve configured to one of facilitate flow communication or prevent flow communication between (a) a filter configured to filter one or more of: (i) particulates or (ii) liquids from fuel, and (b) the first gas turbine engine;
 causing a third valve to be in an open condition, the third valve configured to one of facilitate flow communication or prevent flow communication between a pressure source and the filter;
 increasing pressure via the pressure source in the at least a portion of the fuel delivery system;

monitoring a signal indicative of pressure in the at least a portion of the fuel delivery system; and based at least in part on the signal, determining whether the at least a portion of the fuel delivery system has a leak.

2. The method of claim 1, further comprising initiating a timer, wherein the increasing pressure is caused until a preselected time has elapsed as indicated by the timer.

3. The method of claim 2, wherein determining whether the at least a portion of the fuel delivery system has a leak comprises:

comparing the pressure in the at least a portion of the fuel delivery system at the end of the selected time to a preselected pressure; and determining one of:
the at least a portion of the fuel delivery system has a leak when the pressure in the at least a portion of the fuel delivery system is less than the preselected pressure; or the at least a portion of the fuel delivery system does not have a leak when the pressure in the at least a portion of the fuel delivery system is at least the preselected pressure.

4. The method of claim 3, wherein determining the at least a portion of the fuel delivery system does not have a leak further comprises:

initiating the timer;
waiting for a second preselected time to elapse; and
comparing the pressure in the at least a portion of the fuel delivery system at the second predetermined time to the preselected pressure.

5. The method of claim 4, wherein after waiting for the second predetermined time to elapse, the method further comprises determining one of:

the at least a portion of the fuel delivery system has a leak when the pressure in the at least a portion of the fuel delivery system is 5% or more less than the preselected pressure; or the at least a portion of the fuel delivery system does not have a leak when the pressure in the at least a portion of the fuel delivery system is within 5% of the preselected pressure or greater.

6. The method of claim 1, wherein increasing pressure via the pressure source in the at least a portion of the fuel delivery system comprises one or more of:

activating a compressor in flow communication with the at least a portion of the fuel delivery system; or opening a valve of a pressurized cylinder in flow communication with the at least a portion of the fuel delivery system.

7. The method of claim 1, further comprising generating a signal indicative of a leak when the method determines the at least a portion of the fuel delivery system has a leak.

8. The method of claim 1, further comprising:
initiating a timer;
ceasing the pressure testing after a preselected time has elapsed;
causing a fourth valve to be in an open condition, the fourth valve configured to release pressure in the at least a portion of the fuel delivery system.

9. The method of claim 1, wherein the fuel delivery system comprises a controller, and wherein the method further comprises one or more of:

causing, via the controller, the first valve to be in the open condition;

causing, via the controller, the second valve to be in the closed condition;

causing, via the controller, the third valve to be in the open condition;

increasing, via the controller, the pressure via the pressure source;

monitoring, via the controller, the signal indicative of pressure, or determining, via the controller, whether the at least a portion of the fuel delivery system has a leak.

10. A method for pressure testing at least a portion of a fuel delivery system for supplying fuel from a fuel source to a plurality of gas turbine engines, the fuel delivery system including a controller, the method comprising:

causing a first valve to be in an open condition, the first valve configured to one of facilitate flow communication or prevent flow communication between the fuel source and a first gas turbine engine of the plurality of gas turbine engines;

causing a second valve to be in a closed condition, the second valve configured to one of facilitate flow communication or prevent flow communication between (a) a filter configured to filter one or more of: (i) particulates or (ii) liquids from fuel, and (b) the first gas turbine engine;

causing a third valve to be in an open condition, the third valve configured to one of facilitate flow communication or prevent flow communication between a pressure source and the filter;

increasing pressure via the pressure source in the at least a portion of the fuel delivery system;

monitoring a signal indicative of pressure in the at least a portion of the fuel delivery system; and based at least in part on the signal, determining whether the at least a portion of the fuel delivery system has a leak, the determining whether the at least a portion of the fuel delivery system has a leak includes:

comparing the pressure in the at least a portion of the fuel delivery system at the end of a preselected time to a preselected pressure; and determining one of:
the at least a portion of the fuel delivery system has a leak when the pressure in the at least a portion of the fuel delivery system is less than the preselected pressure; or the at least a portion of the fuel delivery system does not have a leak when the pressure in the at least a portion of the fuel delivery system is at least the preselected pressure.

11. The method of claim 10, further comprising one or more of:

causing, via the controller, the first valve to be in the open condition;

causing, via the controller, the second valve to be in the closed condition;

causing, via the controller, the third valve to be in the open condition;

increasing, via the controller, the pressure via the pressure source;

monitoring, via the controller, the signal indicative of pressure, or determining, via the controller, whether the at least a portion of the fuel delivery system has a leak.

12. The method of claim 11, further comprising:
initiating a timer;
ceasing the pressure testing after a predetermined time has elapsed;

causing a fourth valve to be in an open condition, the fourth valve configured to release pressure in the at least a portion of the fuel delivery system.

13. The method of claim 10, wherein increasing pressure via the pressure source in the at least a portion of the fuel delivery system comprises one or more of:
   activating a compressor in flow communication with the at least a portion of the fuel delivery system; or
   opening a valve of a pressurized cylinder in flow communication with the at least a portion of the fuel delivery system.

14. The method of claim 13, wherein determining the at least a portion of the fuel delivery system does not have a leak further comprises:
   initiating a timer;
   waiting for a preselected time to elapse; and
   comparing the pressure in the at least a portion of the fuel delivery system at the preselected time to the preselected pressure.

15. The method of claim 14, wherein after waiting for the preselected time to elapse, the method further comprises determining one of:
   the at least a portion of the fuel delivery system has a leak when the pressure in the at least a portion of the fuel delivery system is 5% or more less than the preselected pressure; or
   the at least a portion of the fuel delivery system does not have a leak when the pressure in the at least a portion of the fuel delivery system is within 5% of the preselected pressure or greater.

* * * * *